United States Patent
Chen et al.

(10) Patent No.: US 10,880,167 B2
(45) Date of Patent: Dec. 29, 2020

(54) HIGH RELIABILITY LOW LATENCY CONFIGURATION FOR WIRELESS COMMUNICATIONS SYSTEMS

(71) Applicant: QUALCOMM Incorporated, San Diego, CA (US)

(72) Inventors: Wanshi Chen, San Diego, CA (US); Seyedkianoush Hosseini, San Diego, CA (US); Alberto Rico Alvarino, San Diego, CA (US); Shimman Arvind Patel, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/915,430

(22) Filed: Mar. 8, 2018

(65) Prior Publication Data

US 2018/0262398 A1   Sep. 13, 2018

Related U.S. Application Data

(60) Provisional application No. 62/470,187, filed on Mar. 10, 2017.

(51) Int. Cl.
*H04L 12/24*   (2006.01)
*H04W 76/27*   (2018.01)
(Continued)

(52) U.S. Cl.
CPC ........ *H04L 41/0836* (2013.01); *H04L 5/0055* (2013.01); *H04W 24/02* (2013.01);
(Continued)

(58) Field of Classification Search
CPC ..... H04W 24/02; H04W 52/08; H04W 52/10; H04W 52/18; H04W 72/0406;
(Continued)

(56) References Cited

U.S. PATENT DOCUMENTS

| | | | |
|---|---|---|---|
| 2016/0128090 A1 | 5/2016 | Azarian et al. | |
| 2016/0234857 A1* | 8/2016 | Chen | H04W 72/1231 |
| 2018/0049165 A1* | 2/2018 | Byun | H04W 72/0446 |

FOREIGN PATENT DOCUMENTS

EP   2244433 A1   10/2010

OTHER PUBLICATIONS

International Search Report and Written Opinion—PCT/US2018/021815—ISA/EPO—dated May 28, 2018.
(Continued)

*Primary Examiner* — Natasha W Cosme
(74) *Attorney, Agent, or Firm* — Holland & Hart LLP

(57) ABSTRACT

Methods, systems, and devices for wireless communication are described. Wireless communications systems as described herein may be configured to support several service types with different latency, reliability, or throughput rates or standards. One such service type may be referred to as high-reliability, low latency communication (HRLLC). Enhancements to improve HRLLC performance in coexistence with and as a complement to legacy service types, such as LTE are described. These include, for example, downlink and uplink control enhancements, channel state information (CSI) feedback enhancements, physical uplink shared channel (PUSCH) enhancements, and UL power control enhancements to support HRLLC.

53 Claims, 22 Drawing Sheets

(51) Int. Cl.
*H04W 72/04* (2009.01)
*H04W 24/02* (2009.01)
*H04W 52/18* (2009.01)
*H04L 5/00* (2006.01)
*H04W 72/12* (2009.01)
*H04W 52/10* (2009.01)
*H04W 52/08* (2009.01)

(52) U.S. Cl.
CPC ......... *H04W 52/18* (2013.01); *H04W 72/044* (2013.01); *H04W 72/0406* (2013.01); *H04W 72/12* (2013.01); *H04W 76/27* (2018.02); *H04W 52/08* (2013.01); *H04W 52/10* (2013.01)

(58) Field of Classification Search
CPC ... H04W 72/044; H04W 72/12; H04W 76/27; H04L 41/0836; H04L 5/0055
USPC ........................................................ 370/254
See application file for complete search history.

(56) References Cited

OTHER PUBLICATIONS

Samsung: "Design Aspects of URLLC for NR", 3GPP Draft; R1-164002, 3rd Generation Partnership Project (3GPP), Mobile Competence Centre; 650, Route Des Lucioles; F-06921 Sophia-Antipolis Cedex; France vol. RAN WG1, No. Nanjing, China; May 23, 2016-May 27, 2016 May 13, 2016, XP051096920, Retrieved from the Internet: URL:http://www.3gpp.org/ftp/tsg_ran/WG1_RL1/TSGR1_85/Docs/ [retrieved on May 13, 2016], 4 pages.
Ericsson: "Logical Channel Prioritization with short TTI," 3GPP Draft; R2-1701609—LCP and STTI, 3rd Generation Partnership Project (3GPP), Mobile Competence Centre; 650, Route Des Lucioles; F-06921, Sophia-Antipolis Cedex; France, vol. RAN WG2, No. Athens, Greece; Feb. 13, 2017-Feb. 17, 2017, Feb. 12, 2017, XP051212203, 3 Pages, Retrieved from the Internet: URL: http://www.3gpp.org/ftp/Meetings_3GPP_SYNC/RAN2/Docs/ [retrieved on Feb. 12, 2017].

* cited by examiner

HIGH RELIABILITY LOW LATENCY CONFIGURATION FOR WIRELESS COMMUNICATIONS SYSTEMS

CROSS REFERENCES

The present application for patent claims priority to U.S. Provisional Patent Application No. 62/470,187 by Chen et al., entitled "High Reliability Low Latency Configuration for Wireless Communications Systems" and filed Mar. 10, 2017, which is assigned to the assignee hereof and is hereby incorporated by reference in its entirety.

BACKGROUND

The present disclosure, for example, relates to wireless communication systems and more particularly to high reliability low latency configuration for wireless communications systems.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

Different UEs within a multiple-access communications system may have varying standards from one another based on particular applications or deployments. Systems may therefore need to support multiple wireless communication services. But because of the mobile nature of some UEs and the dynamic character of mobile originated and mobile terminated data, the system may need to dynamically change the wireless communication service for a given UE. Reliance and resource configurations or legacy feedback mechanisms, for example, may limit the system's ability to meet such needs.

SUMMARY

Some wireless communication systems may be operable to support several wireless communications service types using various enhancements to resource configurations, feedback mechanisms, and the like. A system may, for example, support a service type associated with communications having high reliability and low latency. In such systems, these high reliability, low latency communications (HRLLCs) may be configured to coexist with other service types with different (e.g., more relaxed) latency and reliability constraints. Considerations for such systems may include configuration of HRLLC, DL control enhancements, UL control enhancements, channel state information (CSI) enhancements, physical uplink shared channel (PUSCH) enhancements, UL power control enhancements, and backhaul handling. Various methods, systems, and apparatuses are described herein that support high reliability, low latency configurations.

A method for wireless communication in a system that supports a first wireless service having a first target decoding error rate and a first target latency value and a second wireless service having a second target decoding error rate that is higher than the first target decoding error rate or a second target latency that is higher than the first target latency value is described. The method may include identifying resources for assignment to a user equipment (UE) for the first wireless service. The first wireless service and the second wireless service may have transmission time intervals (TTIs) of a same duration. The method may also include transmitting a control message that assigns the resources for the first wireless service to the UE during one of the TTIs.

An apparatus for wireless communication in a system that supports a first wireless service having a first target decoding error rate and a first target latency value and a second wireless service having a second target decoding error rate that is higher than the first target decoding error rate or a second target latency that is higher than the first target latency value is described. The apparatus may include means for identifying resources for assignment to a user equipment (UE) for the first wireless service, where the first wireless service and the second wireless service have transmission time intervals (TTIs) of a same duration. The apparatus may also include means for transmitting a control message that assigns the resources for the first wireless service to the UE during one of the TTIs.

Another apparatus for wireless communication in a system that supports a first wireless service having a first target decoding error rate and a first target latency value and a second wireless service having a second target decoding error rate that is higher than the first target decoding error rate or a second target latency that is higher than the first target latency value is described. The apparatus may include a processor, memory in electronic communication with the processor, and instructions stored in the memory. The instructions may be executable by the processor to cause the apparatus to identify resources for assignment to a user equipment (UE) for the first wireless service, wherein the first wireless service and the second wireless service have transmission time intervals (TTIs) of a same duration and transmit a control message that assigns the resources for the first wireless service to the UE during one of the TTIs.

A non-transitory computer readable medium for wireless communication in a system that supports a first wireless service having a first target decoding error rate and a first target latency value and a second wireless service having a second target decoding error rate that is higher than the first target decoding error rate or a second target latency that is higher than the first target latency value is described. The non-transitory computer-readable medium may include instructions executable to identify resources for assignment to a user equipment (UE) for the first wireless service, wherein the first wireless service and the second wireless service have transmission time intervals (TTIs) of a same duration and transmit a control message that assigns the resources for the first wireless service to the UE during one of the TTIs.

Another method of for wireless communication in a system that supports a first wireless service having a first target decoding error rate and a first target latency value and a second wireless service having a second target decoding error rate that is higher than the first target decoding error rate or a second target latency that is higher than the first target latency value is described. The method may include receiving, at a user equipment (UE) and during a first transmission time interval (TTI), a control message from a base station, where the first wireless service and the second wireless service have TTIs of a same duration. The method may also include determining resources assigned for the first wireless service based at least in part on the control message and receiving data during the first TTI or transmitting data during a second TTI using the resources assigned for the first wireless service.

Another apparatus for wireless communication in a system that supports a first wireless service having a first target decoding error rate and a first target latency value and a second wireless service having a second target decoding error rate that is higher than the first target decoding error rate or a second target latency that is higher than the first target latency value is described. The apparatus may include means for receiving, at a user equipment (UE) and during a first transmission time interval (TTI), a control message from a base station, where the first wireless service and the second wireless service have TTIs of a same duration. The apparatus may also include means for determining resources assigned for the first wireless service based at least in part on the control message and means for receiving data during the first TTI or transmitting data during a second TTI using the resources assigned for the first wireless service.

Another apparatus for wireless communication in a system that supports a first wireless service having a first target decoding error rate and a first target latency value and a second wireless service having a second target decoding error rate that is higher than the first target decoding error rate or a second target latency that is higher than the first target latency value is described. The apparatus may include a processor, memory in electronic communication with the processor, and instructions stored in the memory. The instructions may be executable by the processor to cause the apparatus to receive, at a user equipment (UE) and during a first transmission time interval (TTI), a control message from a base station, where the first wireless service and the second wireless service have TTIs of a same duration, determine resources assigned for the first wireless service based at least in part on the control message, and receive data during the first TTI or transmitting data during a second TTI using the resources assigned for the first wireless service.

A non-transitory computer readable medium for wireless communication in a system that supports a first wireless service having a first target decoding error rate and a first target latency value and a second wireless service having a second target decoding error rate that is higher than the first target decoding error rate or a second target latency that is higher than the first target latency value is described. The non-transitory computer-readable medium may include instructions executable to receive, at a user equipment (UE) and during a first transmission time interval (TTI), a control message from a base station, wherein the first wireless service and the second wireless service have TTIs of a same duration, determine resources assigned for the first wireless service based at least in part on the control message, and receive data during the first TTI or transmitting data during a second TTI using the resources assigned for the first wireless service.

DETAILED DESCRIPTION

Wireless communications systems as described herein may be configured to support a plurality of service types with different latency, reliability, or throughput rates or standards. One such service type may be referred to herein as high reliability, low latency communication (HRLLC). Various techniques described may be employed to improve HRLLC performance while supporting coexistence with legacy service types or other service types that may be supported by the wireless communications system. The described techniques may be employed for HRLLC enhancements, downlink and uplink control enhancements, channel state information (CSI) feedback enhancements, physical uplink shared channel (PUSCH) enhancements, and UL power control enhancements.

By way of example, a base station in some LTE or NR deployments may transmit to one or more UEs using reduced scheduling timing to meet various latency and reliability standards. A base station may allocate transmission resources to a UE that may include time resources and frequency resources. In some cases, reliability for low latency services may be enhanced through feedback mechanisms that may provide for retransmission of unsuccessfully received transmissions, such as according to hybrid acknowledgment repeat request (HARQ) feedback techniques, for example. The various enhancements described herein may increase the efficiency and reliability of a wireless communications system.

Aspects of the disclosure introduced above are described below in the context of a wireless communications system. Examples of various channel configurations and resource allocation schemes are described. Aspects of the disclosure are further illustrated by and described with reference to apparatus diagrams, system diagrams, and flowcharts that relate to high reliability, low latency communication.

Figure 1:
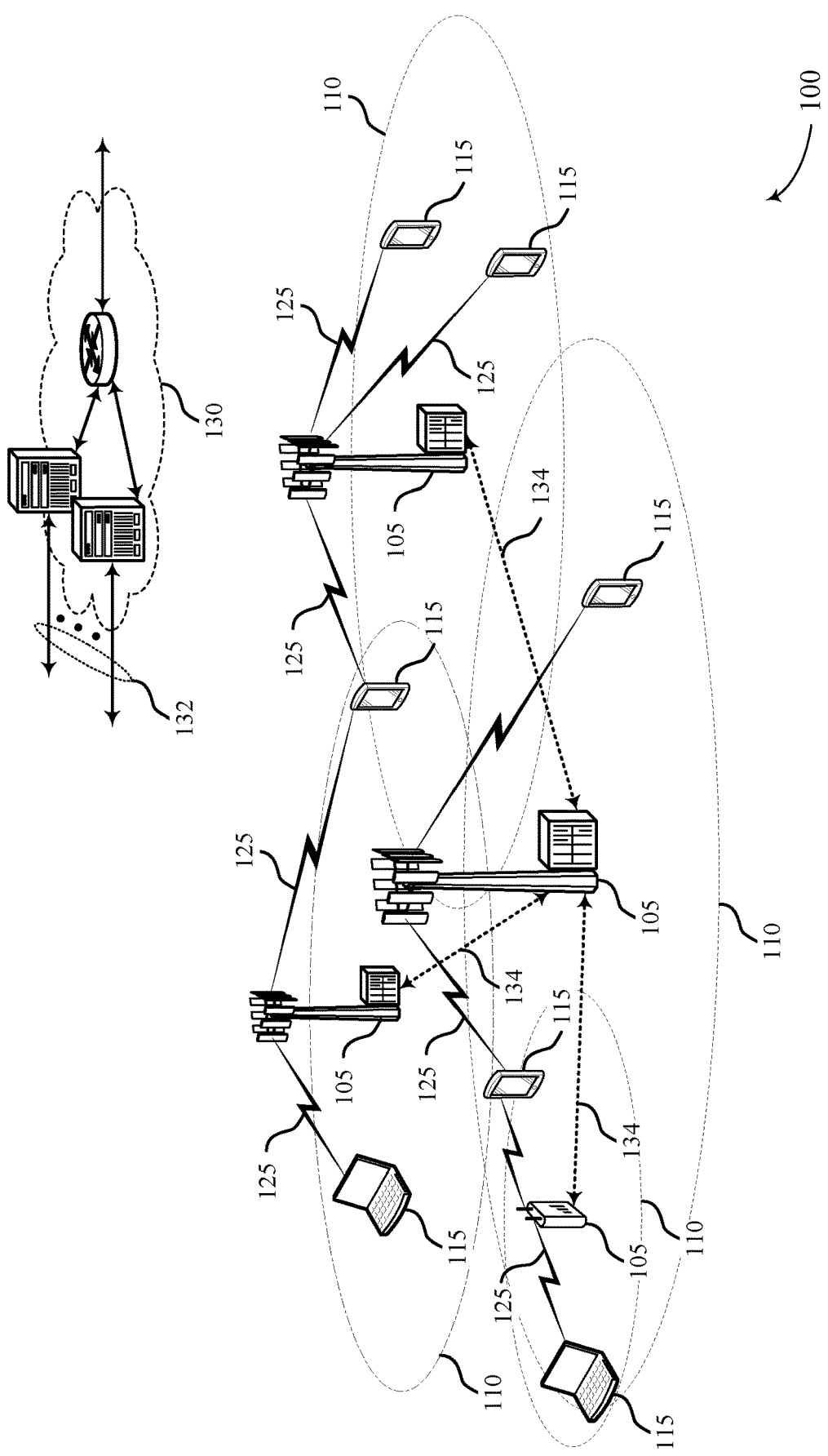
FIG. 1 illustrates an example of a system for wireless communication that supports high reliability low latency configuration in accordance with aspects of the present disclosure.

FIG. 1 illustrates an example of a wireless communications system 100 in accordance with various aspects of the disclosure. The wireless communications system 100 includes base stations 105, user equipment (UEs) 115, and a core network 130. System 100 may be configured to provide multiple wireless communication services, including, for example high reliability low latency communications.

The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller. In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, evolved NodeB (eNB), Home NodeB, a Home eNodeB, a next generation nodeB (gNB), or some other suitable terminology. The geographic coverage area 110 for a base station 105 may be divided into sectors making up only a portion of the coverage area. The wireless communications system 100 may include base stations 105 of different types (e.g., macro and/or small cell base stations). There may be overlapping geographic coverage areas 110 for different technologies. Base station 105 may support multiple wireless communication services on one or more cells. Base stations 105 may, for example, be configured for high reliability, low latency communications in addition to other mobile broadband, broadcast, and or other services.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels.

The MAC layer may also use Hybrid Automatic Repeat Request (HARQ) to provide retransmission at the MAC layer to improve link efficiency. HARQ enables the overhead of error correction to be adapted dynamically depending on the channel quality. When HARQ is used, if errors are able to be corrected using forward error correction (FEC) techniques, then no retransmission is requested. If errors are detected but not corrected, a retransmission is requested. Thus, HARQ is a method of ensuring that data is received correctly over a wireless communication link 125. HARQ may include a combination of error detection (e.g., using a cyclic redundancy check (CRC)), FEC, and retransmission (e.g., automatic repeat request (ARQ)) and may improve throughput at the MAC layer in poor radio conditions. In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125.

In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to physical channels. Different wireless communication services may be configured or activated by RRC or PHY layer signaling in various examples. For instance, a UE 115 may be configured for URLLC using RRC signaling, and the UE 115 may be assigned time-frequency resources for URLLC using PHY layer control signaling.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations 105 and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. Communication links 125 may represent various wireless communication services, such as URLLC.

The communication links 125 may transmit bidirectional communications using frequency division duplexing (FDD) (e.g., using paired spectrum resources) or time division duplexing (TDD) operation (e.g., using unpaired spectrum resources). Frame structures for FDD (e.g., frame structure (FS) type 1) and TDD (e.g., FS type 2) may be defined. Frame structures for unlicensed carriers (e.g., FS type 3) may also be defined.

In some examples, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Some examples of wireless communication system 100 (e.g., new radio (NR) systems, next generation LTE systems, etc.), may support communications with high reliability and low latency. For example, ultra-reliable, low latency communication (URLLC) (e.g., for an NR system) may be defined by certain targets. For example, URLLCs may target a reliability of $10^{-5}$ within a 1-ms transmission time interval (TTI). In this example, the reliability may refer to a bit error rate or some other suitable metric (e.g., such that the probability that a given bit may be decoded correctly is $1-10^{-5}$). Such communications may be associated with an ultra-reliable low-latency communication channel (URLCC). In some wireless systems (e.g., LTE systems), URLCC may be enabled for both 1-ms TTIs and shortened TTIs (sTTIs). That is, some systems (e.g., which may be referred to as legacy systems) may support only 1-ms based TTIs with at least 4-ms HARQ/scheduling timing. Such scheduling timing may be referred to in aspects of the present disclosure as 'n+4' timing. However, some such systems may be modified to introduce sTTIs (e.g., to reduce latency) along with modified 1-ms TTIs (e.g., with reduced timing). For example, some such systems may support a 1-ms TTI with 3-ms HARQ/scheduling timing (e.g., which may be referred to as 'n+3' timing herein), 2-symbol sTTI for FDD (e.g., for FS type 1), 1-slot sTTI for FDD and TDD (e.g., for FS type 2), and other duration TTIs no sTTIs for FS type 3.

In aspects of the present disclosure, the 1-ms based TTI may be further enhanced (e.g., to support high reliability, low latency communications (HRLLC)). In some cases, HRLLCs may be examples of URLLCs. For example, HRLLCs may have relaxed latency and/or reliability standards compared to URLLCs, though both may offer improved latency and reliability compared to other (e.g., conventional) communications. In some examples, the enhancements may enable a base station 105 to have some flexibility in targeting the performance metrics. That is, the base station 105 may manage the desired reliability under a certain delay constraint. Aspects of the present disclosure are described with reference to UEs 115 operating in a connected mode or RRC connected mode (e.g., RRC_CONNECTED UEs 115), though UEs 115 operating in an idle mode or RRC idle mode UEs 115 (e.g., RRC_IDLE UEs 115) are also considered, and those skilled in the art will recognize the applicability to both RRC_CONNECTED and RRC_IDLE UEs 115. Techniques described herein consider configuration of HRLLC, DL control enhancements, UL control enhancements, channel state information (CSI) enhancements, physical uplink shared channel (PUSCH) enhancements, UL power control enhancements, and backhaul handling.

Figure 2:
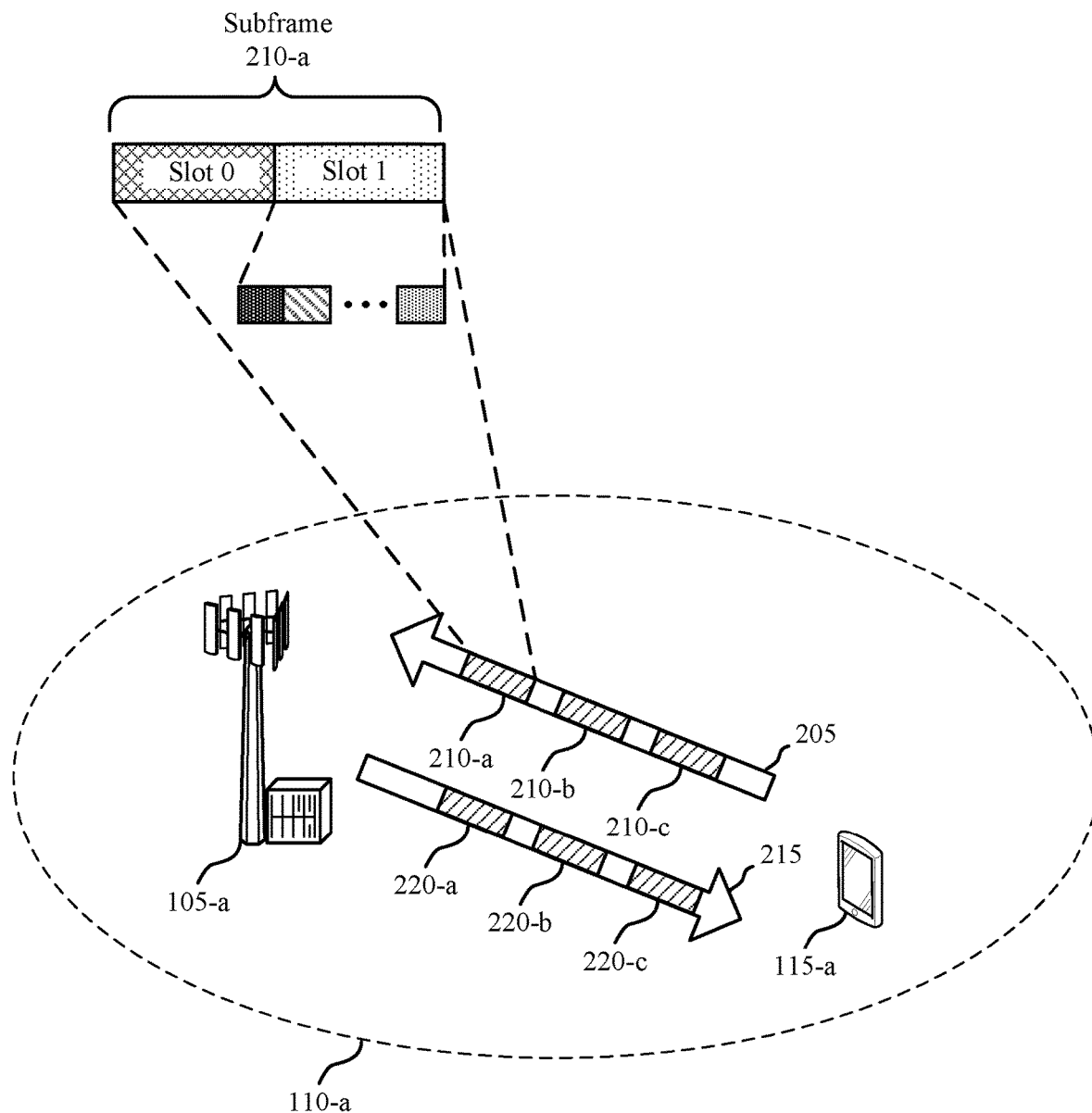
FIG. 2 illustrates an example of a wireless communication system that supports high reliability low latency configuration in accordance with aspects of the present disclosure.

FIG. 2 illustrates an example of a wireless communications system 200 that supports high reliability low latency configuration in accordance with various aspects of the present disclosure. Wireless communications system 200 includes base station 105-*a* and UE 115-*a*, which may be examples of aspects of the corresponding devices as described above with reference to FIG. 1. In the example of FIG. 2, the wireless communications system 200 may operate according to a radio access technology (RAT) such as a LTE, 5G, or NR RAT, although techniques described herein may be applied to any RAT and to systems that may concurrently use two or more different RATs.

Base station 105-*a* may communicate with UE 115-*a* over an uplink carrier 205 and a downlink carrier 215. In some examples, base station 105-*a* may allocate resources for communication with UEs over uplink carrier 205 and downlink carrier 215. For example, base station 105-*a* may allocate uplink subframes 210 in uplink carrier 205 for uplink transmissions from UE 115-*a*, and one or more uplink subframes 210 may correspond to a legacy LTE TTI of 1 ms. In this example, uplink subframes 210 may include a first uplink subframe 210-*a*, a second uplink subframe 210-*b*, and a third uplink subframe 210-*c*. Each of the uplink subframes 210 may include two slots, in which each slot may have seven OFDM symbols for a normal cyclic prefix. In this example, a first slot (slot 0) 225 and a second slot (slot 1) 230 may be included in the first subframe 210-*a*. Shortened TTIs may be included or coincide with a slot; sTTIs may include several sTTIs, like sTTI-0 235, sTTI-1 240 . . . , sTTI-n 245.

As indicated above, in the uplink carrier 205 of a low latency wireless communication system 200, different TTI lengths may be used for transmissions over uplink carrier 205 and/or downlink carrier 215. For example, two-symbol sTTI and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). Aspects of the present disclosure are described with reference to 1-ms based TTIs, though they may also apply to low latency communications using such variable length TTIs (e.g., sTTIs).

In some examples, UE 115-*a* may be semi-statically configured (e.g., and/or dynamically triggered) with HRLLC while still maintaining legacy 1-ms TTI based communications. By way of example, the possible combinations of 1-ms based TTI for a UE 115 may include 1-ms TTI with n+4 timing, 1-ms TTI with n+4 timing and n+3 timing without HRLLC, 1-ms TTI with n+4 timing and n+3 timing with HRLLC, and 1-ms TTI with n+4 timing and n+3 timing with and without HRLLC. Such timing may be referred to as scheduling timing, as discussed above, and may relate to the number of TTIs or sTTIs between a downlink transmission (e.g., PDCCH, PUSCH, etc.) and a responsive uplink transmission (e.g., PUCCH, PUSCH, etc.). Or the timing may relate to an uplink transmission and a responsive downlink transmission (e.g., PDSCH, retransmission, etc.).

In some examples, the differentiation of HRLLC as compared to regular communications (e.g., non-HRLLC, MBB, legacy LTE, etc.) may be explicitly indicated. For example, a different radio network temporary identifier (RNTI) may be used for HRLLC, different downlink control information (DCI) formats, different control decoding candidates (which may also be called search candidates), some indication (e.g., implicit or explicit) in DCI, semi-static configuration (e.g., via RRC signaling), etc. As indicated above, in some cases TTI configurations and HARQ timing may be configured to provide for an initial transmission and a retransmission of the initial transmission within a low latency timing interval (e.g., 1-ms). Thus, multiple transmission opportunities may be present in a TTI.

Figure 3:
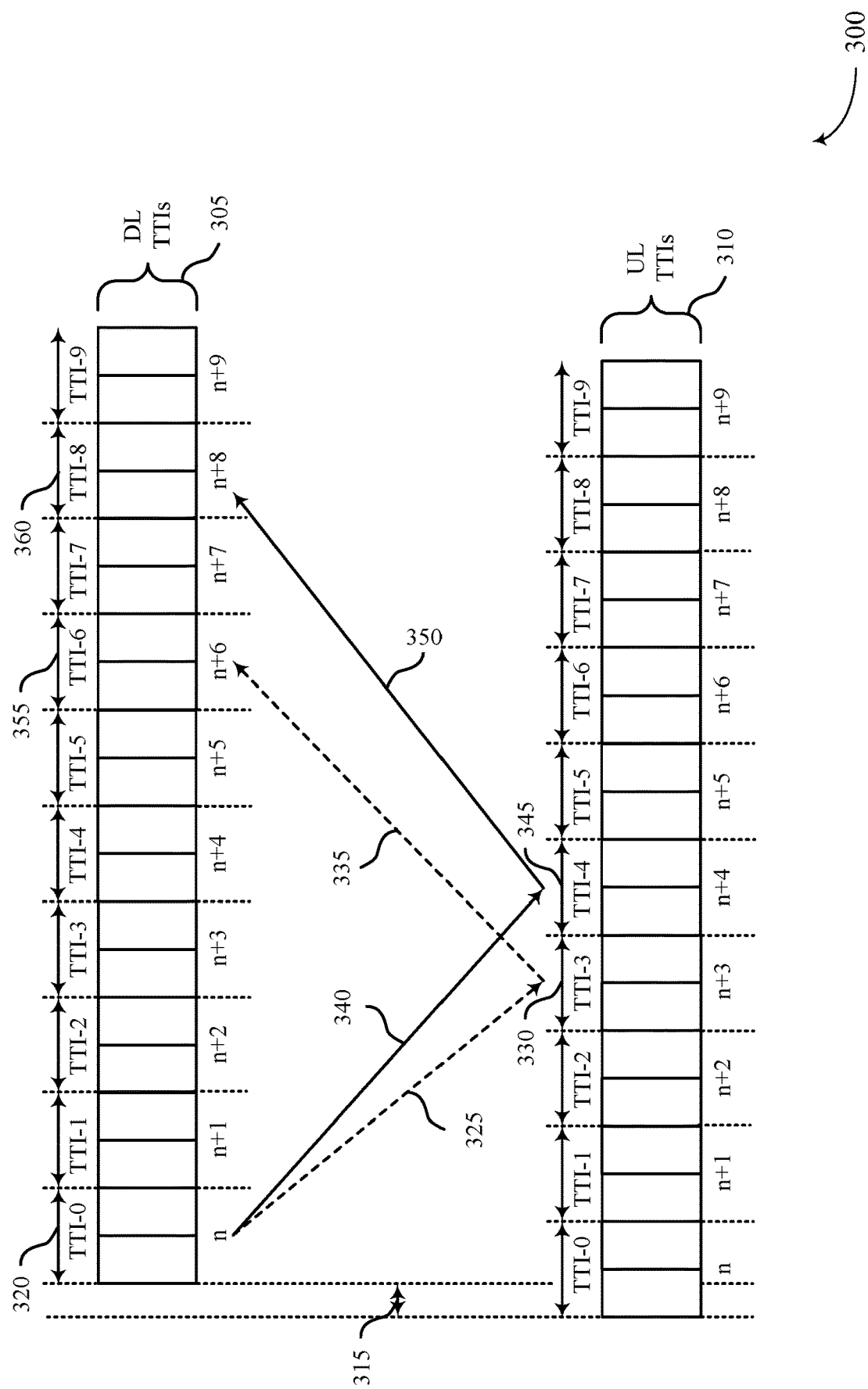
FIG. 3 illustrates example uplink and downlink transmission time intervals (TTIs) that support high reliability low latency configuration for wireless communications systems in accordance with aspects of the present disclosure.

FIG. 3 illustrates an example of uplink and downlink TTIs 300 in accordance with various aspects of the present disclosure. Uplink and downlink TTIs 300 may be used for communications between a UE 115 and a base station 105 such as discussed above with reference to FIGS. 1 and 2. In this example, downlink TTIs 305 may be used for downlink transmissions from a base station 105 to a UE 115. Similarly, uplink TTIs 310 may be used for uplink transmissions from a UE 115 to a base station 105. Uplink and downlink TTIs 300 illustrate aspects of n+4 timing and n+3 timing, as described above. As illustrated, uplink and downlink TTIs 300 each contain two slots.

As an example, a first downlink TTI 320 may be transmitted to a UE 115, and the UE 115 may attempt to demodulate and decode the transmission and generate an ACK/NACK indication 325 that may be transmitted in uplink TTI 330, which may be a first uplink TTI that starts at or after n+3 TTIs after the first downlink TTI 320. In the event that the ACK/NACK indication is a NACK, the base station may format a rescheduling and retransmission 335 to the UE, which may be transmitted in a first downlink TTI that starts at or after n+3 TTIs after the ACK/NACK indication 325, which in this example is downlink TTI-6 355. Similarly, ACK/NACK feedback for downlink TTI-1 may be transmitted in uplink TTI-4 345, ACK/NACK feedback for downlink TTI-2 may be transmitted in uplink TTI-5, and so on.

As a second example, a first downlink TTI 320 may be transmitted to a UE 115, and the UE 115 may attempt to demodulate and decode the transmission and generate an ACK/NACK indication 340 that may be transmitted in uplink TTI-4 345, which may be a first uplink TTI that starts at or after n+4 TTIs after the first downlink TTI 320. In the event that the ACK/NACK indication is a NACK, the base station may format a rescheduling and retransmission 350 to the UE, which may be transmitted in a first downlink TTI that starts at or after n+4 TTIs after the ACK/NACK indication 340, which in this example is downlink TTI-8 360. Similarly, ACK/NACK feedback for downlink TTI-1 may be transmitted in uplink TTI-5, ACK/NACK feedback for downlink TTI-2 may be transmitted in uplink TTI-6, and so on.

As illustrated, overall HARQ feedback timing may be reduced when using n+3 timing relative to n+4 timing. For low latency services with high reliability standards, such as some proposed HRLLC standards, HARQ feedback using an n+4 timing may not provide targeted reliability and latency. Accordingly, the configuration of the HRLLC may only be applicable to n+3 timing. However, the applicability of the configuration may depend on the maximum timing advance (TA) 315 and/or transport block size (TB S) limitations for n+3 communications. TA 315 may refer to the amount of time that a UE 115 begins transmitting its uplink frames before the arrival of the corresponding downlink frames. In some examples, TA 315 may vary between n+3 timing and n+4 timing. Accordingly, if the maximum TA 315 for n+3 timing is smaller (e.g., significantly smaller) than for n+4 timing, HRLLC configuration may additionally or alternatively be applicable for n+4 timing. Thus, while aspects of the disclosure are described with reference to n+3 timing, these aspects may apply to n+4 timing in some cases.

Figure 4:
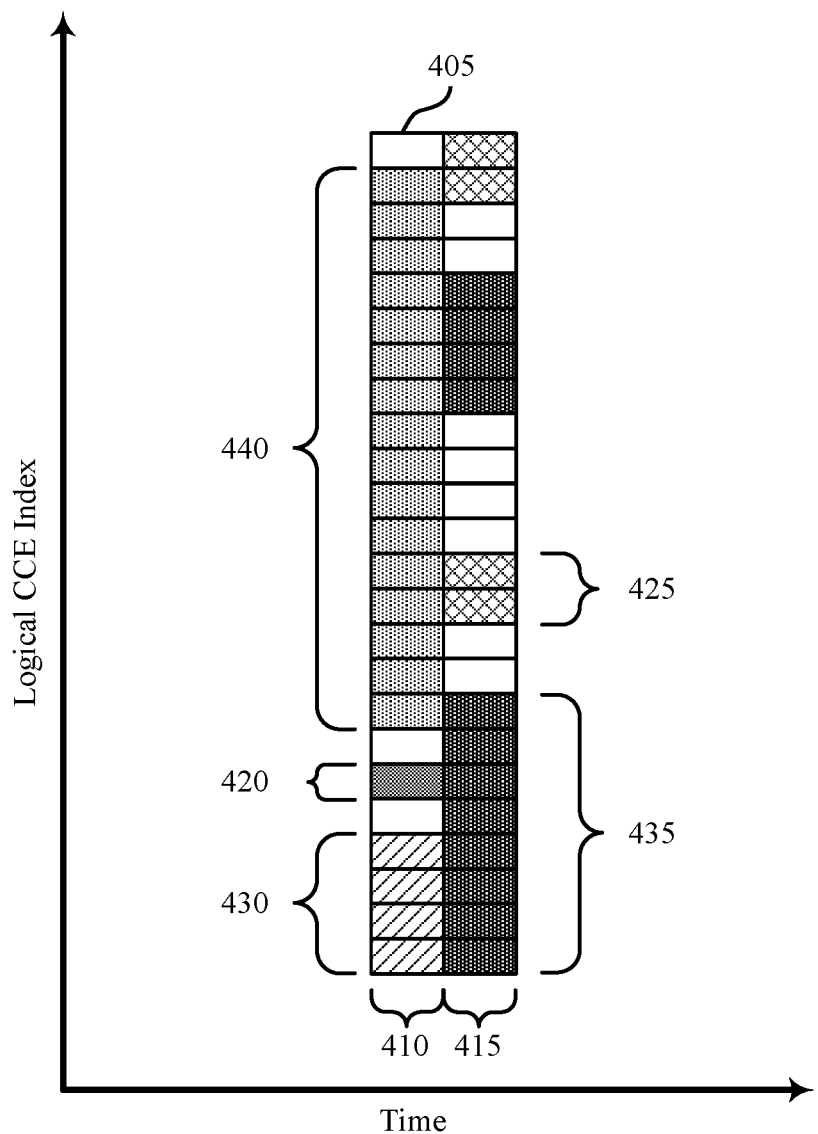
FIG. 4 illustrates an example of control channel configuration that supports high reliability low latency configuration for wireless communications systems in accordance with aspects of the present disclosure.

FIG. 4 illustrates an example control channel configuration 400 in accordance with various aspects of the present disclosure. Control configuration 400 may support enhanced physical downlink control channel (PDCCH) operation with various aggregation levels. For example, higher aggregation levels for DL control channels when HRLLC is configured (e.g., semi-statically) may be introduced while maintaining a same or similar maximum number of blind decodes. In some cases, a same maximum number of blind decodes may only be done for the UE-specific search space (UESS). By way of example, some systems (e.g., legacy systems) may support aggregation levels of 1, 2, 4, or 8 control channel elements (CCEs) for both physical downlink control channel (PDCCH) and enhanced PDCCH (ePDCCH). In accordance with aspects of the present disclosure, the supported aggregation levels for one or both of these channels may be extended to include higher aggregation levels (e.g., 16, 32, etc.). Higher aggregation levels may provide for more reliable control channel information, e.g., which may be important for HRLLC.

Control channel configuration 400 (e.g., which may be an example of a UESS) may be divided into CCEs 405, each of which may span a plurality of REGs. As illustrated in FIG. 4, control channel configuration 400 contains 48 CCEs 405 (i.e., 24 in a respective time periods 410, 415). In some examples, the number of time periods may be dynamically indicated by the physical control format indicator channel (PCFICH). In some cases, time period 410 may represent a first OFDM symbol period and time period 415 may represent a second OFDM symbol period. It is to be understood that the illustrations are for example purposes only, and that aggregation configuration 400 may contain any suitable number of CCEs 405.

As described above, legacy systems may support one, two, four, or eight CCEs 405 being aggregated to form a search candidate 420, 425, 430, or 435, respectively (e.g., for PDCCH or ePDCCH). In aspects of the present disclosure, PDCCH and/or ePDCCH may be configured to support higher aggregation levels. For example, aggregation configuration 400 may additionally support one or more search candidates 440 containing 16 CCEs 405. Even higher aggregation (e.g., 32 CCEs 405) may be achievable in accordance with techniques described herein. As described above, in some cases, each CCE may contain e.g., nine resource element groups (REGs). In some systems (e.g., LTE), these REGs may be logically continuous, but may be mapped in a distributed manner within the aggregation configuration 400. As an example, the 9 REGs may not span tones 0 through 35; rather, a given CCE might be on tones 0, 1, 2, 3, 32, 33, 34, 35, 60, 61, 62, 63, etc. That is, the tones may not be contiguous.

In legacy systems (e.g., systems supporting 1/2/4/8 aggregation levels only), the aggregation configuration 400 may have 6/6/2/2 decoding candidates for aggregation levels 1/2/4/8, respectively. That is, a UE 115 may attempt blind decodes for six search candidates 420, six search candidates 425, two search candidates 430, and two search candidates 435 in search of PDCCH. In some cases, one or more of these various search candidates may overlap (e.g., may share CCEs 405). In aspects of the present disclosure, if HRLLC is configured, the UESS may be appropriately segmented to support higher aggregation levels while maintaining the same (e.g., or a similar) maximum number of maximum blind decodes. For example, if HRLLC is configured, the UESS may have 4/4/2/2/2/2 decoding candidates for aggregation levels 1/2/4/8/16/32, respectively. It should be noted that these numbers are used for illustrative purposes only and that other possible configurations of the UESS are also considered. In some examples, the higher aggregation levels may be done for all DCI formats monitored by a UE 115 or a subset thereof. For example, if DCI format 1A is not enabled for HRLLC but DCI format 2D is enabled, 6/6/2/2 decoding candidates for 1/2/4/8 aggregation levels, respectively, may be used for DCI format 1A while 4/4/2/2/2/2 decoding candidates for 1/2/4/8/16/32 aggregation levels, respectively, may be used for DCI format 2D.

As will be appreciated by considering control channel configuration 400, lower aggregation levels may increase the number of search candidates that may be formed from a given number of CCEs 405 (e.g., which may increase scheduling flexibility or otherwise benefit communications within the system). Accordingly, a base station 105 may be operable to dynamically (e.g., or semi-statically) configure the aggregation levels supported in a given search space based on system communication parameters (e.g., a service type, an amount of traffic, signal quality, etc.). Accordingly, as described in the previous example, the aggregation configuration 400 for one service type (e.g., HRLLC) may support higher aggregation levels while the aggregation configuration 400 for another service type (e.g., non-HRLLC) may support lower aggregation levels.

In some systems (e.g., legacy systems), the maximum number of physical resource blocks (PRBs) for an ePDCCH resource set is eight. In aspects, aggregation configuration 400 may be comprised of an ePDCCH resource set (e.g., such that the number of PRBs in the resource set may determine characteristics of the aggregation configuration 400). That is, the various CCEs 405 may be distributed across the PRBs in a given resource set. In some examples, eight PRBs in a given resource set may not be enough to support aggregation level 32 (e.g., because some resource elements (REs) may be taken over by other signals). Additionally or alternatively, an ePDCCH with this number of PRBs in a resource set may not have enough search candidates for higher aggregation levels, especially when cross-carrier scheduling is enabled (e.g., when a single CC is used to transmit control information for multiple CCs). Accordingly, aspects of the present disclosure consider extending the monitoring to higher aggregation levels (e.g., as described above) and extending the ePDCCH resource set configuration to include a larger number of PRBs (e.g., such that the ePDCCH may support resource sets comprising 16 PRBs). In some examples, a UE 115 may be configured with multiple ePDCCH resource sets (e.g., one set for HRLLC, another set for non-HRLLC, etc.). The configuration may be achieved semi-statically (e.g., through RRC signaling) or dynamically.

Figure 5:
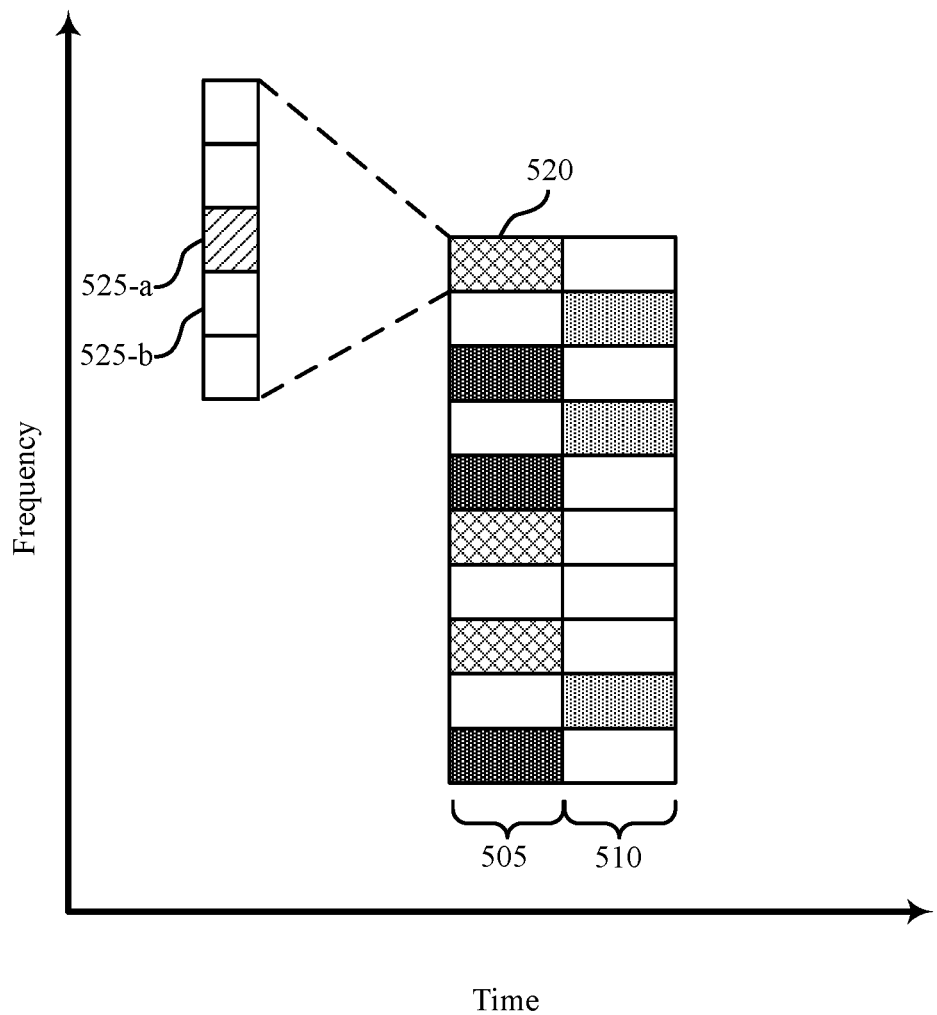
FIG. 5 illustrates an example of a resource allocation that supports high reliability low latency configuration for wireless communications systems in accordance with aspects of the present disclosure.

FIG. 5 illustrates an example resource allocation 500 that supports physical HARQ indicator channel (PHICH) enhancements in accordance with various aspects of the present disclosure. PHICH may carry HARQ indicators from a base station 105 to a UE 115. A base station 105 may transmit each HARQ indicator in the downlink control region using a set of three REGs 520 (e.g., 12 REs 525 total) that is collectively known as a PHICH group 525. In resource allocation 500, three PHICH groups 515-a, 515-b, 515-c are illustrated. PHICH groups 515-a, 515-b are contained within a first time interval 505 while PHICH group 515-c is contained in a second time interval 510, though it is possible that a PHICH group 515 may span multiple time intervals. The number of PHICH groups 515 may depend on the cell bandwidth as well as one or more configurable parameters. Each PHICH group 515 may be mapped to REGs 520 that have not already been assigned to the PCFICH. In some examples, the REs 525 within a given REG 520 may not be contiguous. For example, four PHICH REs 525-b may be separated by one or more occupied REs 525-a (e.g., which may be assigned to PCFICH). In some examples, these PHICH groups 515 may not be dedicated to a single UE 115; instead each PHICH group 515 may be shared by multiple (e.g., up to eight) UEs 115 (e.g., by assigning each UE 115 a different orthogonal sequence index).

Various communications systems may support multiple PHICH configurations. As described above, each PHICH group may include 12 REs 525, which may be multiplexed with multiple PHICHs each associated with a given UE 115 (e.g., in a code division multiplexing (CDM) manner). Accordingly, in the case that n+3 timing is used for HRLLC (e.g., instead of n+4 timing) and the PHICH supports UL asynchronous HARQ, PHICH enhancements may not be applicable. However, if UL synchronous HARQ is supported and the PHICH is used for UL non-adaptive retransmissions for HRLLC, enhancements to the PHICH operation may be desired. In non-adaptive retransmission, a UE 115 may retransmit the data with the same parameters (e.g., bandwidth, coding rate, etc.) that it used for the first transmission. As an example, two or more PHICH REs 525-b may be bundled for a single PHICH transmission for an HRLLC-configured UE 115. In some cases, the bundled PHICH REs 525-b can come from different PHICH groups 515 (e.g., different frequency and/or time resources) instead of two or more sequences being used within the same PHICH group 515. In some examples, the bundling rules may be defined explicitly or implicitly. That is, if the PHICH is determined to use orthogonal sequence n in PHICH group m (e.g., PHICH group 515-a), the bundling can be done to additionally use sequence n+1 in PHICH group m+1 (e.g., PHICH group 515-b).

Figure 6:
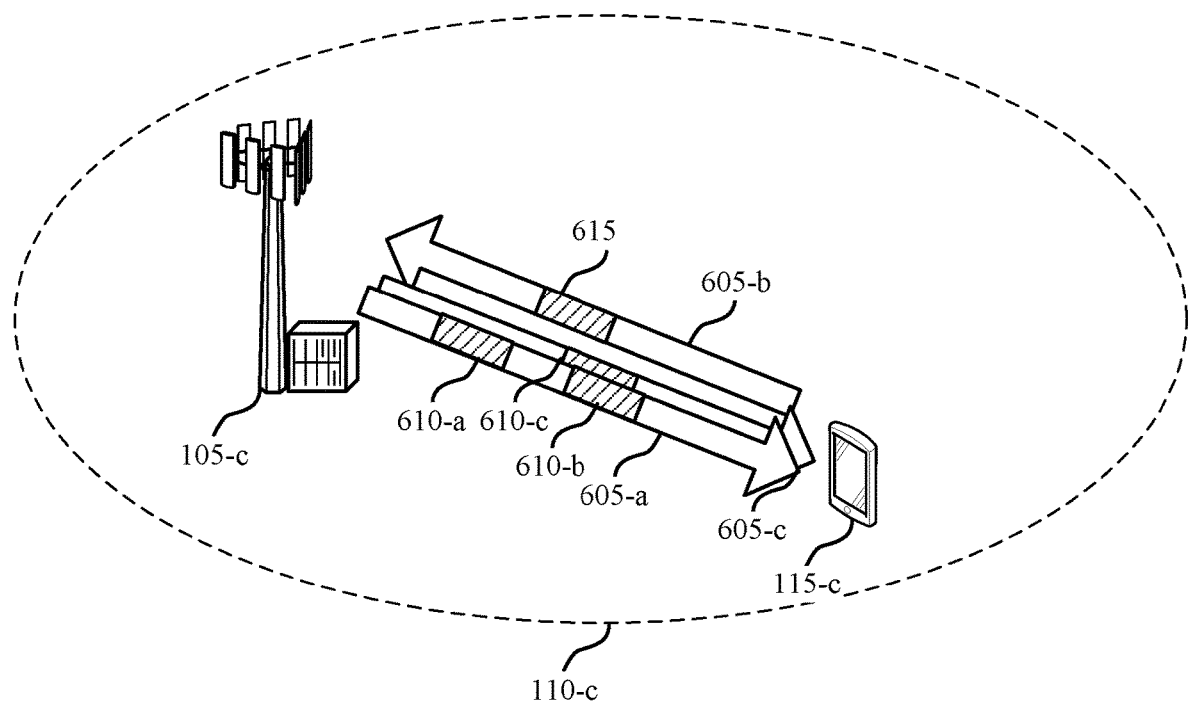
FIG. 6 illustrates an example of a resource allocation scheme that supports high reliability low latency configuration for wireless communications systems in accordance with aspects of the present disclosure.

FIG. 6 illustrates an example transmission scheme 600 that supports UL control enhancements in accordance with various aspects of the present disclosure. Transmission scheme 600 includes UE 115-c and base station 105-c, each of which may be an example of the corresponding device described with reference to FIGS. 1 and 2. In some cases, increased reliability (e.g., for HRLLC) may be accompanied by enhanced HARQ performance. In some example systems, UE 115-c may send HARQ acknowledgements of downlink transmissions received from a base station 105 using physical uplink control channel (PUCCH) resources. PUCCH may additionally carry other uplink control information (e.g., CSI feedback), as described below. As described with reference to FIG. 3, HARQ acknowledgements may be sent using n+3 timing and/or n+4 timing. In some examples, the uplink coverage (e.g., the distance away from a base station over which uplink communications 605 may still be received within geographic coverage area 110-c) for UE 115-c may be improved through resource bundling (e.g., time, frequency, spatial, etc.). However, in some cases, the improvement in coverage (e.g., by time-domain bundling) may be at the expense of the desired low latency.

Accordingly, techniques described herein consider enabling (e.g., permanently) acknowledgement/negative acknowledgment (ACK/NACK) bundling in the spatial domain. By way of example, UE 115-c may be configured with multiple CCs, and over each CC, one or two TBs can be sent in a MIMO fashion. Without spatial multiplexing, for each CC, an ACK/NAK bit may be needed. But as disclosed herein, instead of sending two bits in the UL, the bits may be bundled and one bit may be sent as HARQ feedback for multiple CCs. This may be referred to as spatial bundling or referred to as spatial multiplexing and may increase the reliability of successful decoding of the control information 610.

Additionally, bundling may be performed in the time-domain and/or frequency domain. Time-domain bundling may include bundling ACK/NAK bits associated with TBs sent over different subframes. Frequency-domain bundling may include bundling ACK/NAK bits associated with TBs send on the DL over different CCs. For example, DL CC 605-a may include TBs sent during subframes 610-a and 610-b. HARQ feedback for TBs sent during subframes 610-a and 610-b, which may include bundled ACK/NAK bits, may be sent on UL CC 605-b in UCI sent during TTI 615. This may be referred to as time-domain bundling or time bundling. Additionally or alternatively, DL CC 605-a may include a TB send during subframe 610-a and DL CC 605-c may include a TB send during subframe 610-c. HARQ feedback for TBs sent during subframes 610-a and 610-c, which may include bundled ACK/NAK bits, may be sent on UL CC 605-b in UCI sent during TTI 615. This may be referred to as frequency-domain bundling or frequency bundling. In some cases, these bundling techniques may be used in various combinations. In aspects, uplink control information 610 may carry ACK/NACK information for multiple TTIs and/or codewords (e.g., which may be referred to as block ACK/NACK). In some cases, ACK/NACK bits may be sent repeatedly over multiple TTIs.

In some cases (e.g., when CSI is present in uplink control information 610), UE 115-c may be configured to drop the CSI in favor of ACK/NACK for HRLLC services. For example, if UCI element 625-b is allocated to carry CSI, UE 115-c may be configured to assign some or all of the resources of UCI element 625-b to carry ACK/NACK for HRLLC services. In examples, the CSI may be dropped completely or otherwise have its payload limited (e.g., only rank indicator (RI), precoding matrix indicator (PMI), and precoding type indicator (PTI) without channel quality indicator (CQI)). In some cases, scheduling request (SR) transmissions may also be associated with improved performance (e.g., higher reliability and/or lower latency) when UL HRLLC services are configured. For example, SR transmissions may be combined with HARQ-ACK.

Additionally or alternatively, aspects of the present disclosure consider configuration of a UE 115-c to support at least two sets of CSI feedbacks. In this example, uplink control information 610-a, 610-b on respective uplink carriers 605-a, 605-b may carry respective CSI feedback. For example, one set of CSI feedback (e.g., for uplink control information 610-a) may be used for regular services (e.g., assuming 10% block error rate (BLER) after initial transmission). Another set of CSI feedback (e.g., for uplink control information 610-b) may be used for HRLLC services (e.g., assuming 1% BLER after initial transmission). Within this second set, further considerations may include introduction of two or more interference hypotheses. One such hypothesis may correspond to no or minimal inter-cell HRLLC interference while another hypothesis may correspond to other (e.g., typical) inter-cell HRLLC interference. Such a multi-hypothesis scheme may be realized by two sets of interference measurement resources (IMRs) for CSI feedback, where each set of IMRs may have different inter-cell HRLLC interference characteristics. In some cases (e.g., if the two sets of uplink control information 610-a, 610-b collide in a given subframe), UE 115-c may be configured to transmit both sets or only one set (e.g., such that the HRLLC CSI feedback of uplink control information 610-b may be prioritized in high interference scenarios).

Figure 7:
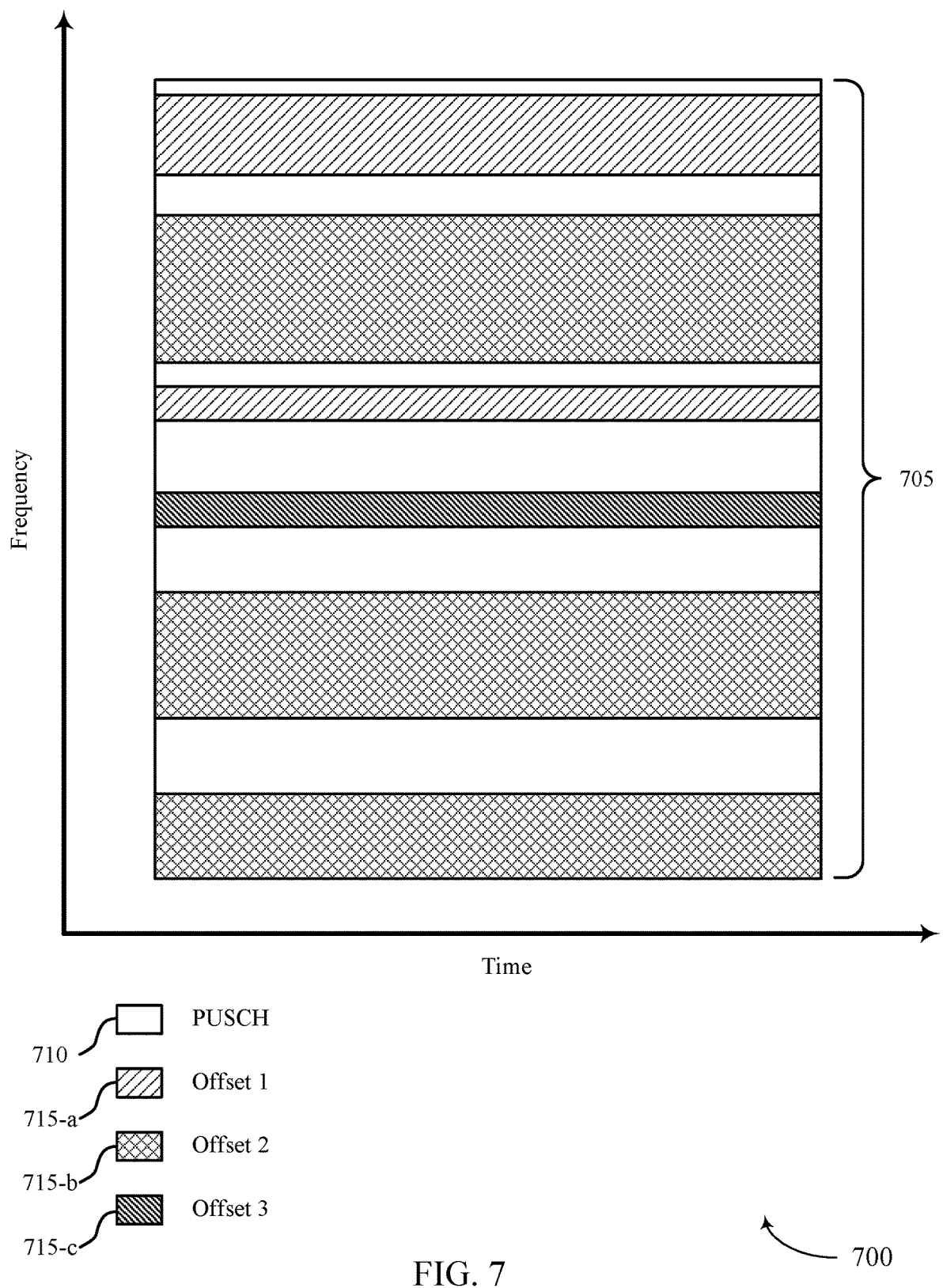
FIG. 7 illustrates an example of a resource allocation that supports high reliability low latency configuration for wireless communications systems in accordance with aspects of the present disclosure.

FIG. 7 illustrates an example of a resource allocation 700 that supports PUSCH enhancements in accordance with various aspects of the present disclosure. In some systems, when UCI is piggy-backed on PUSCH resources 705, higher layer-configured offset(s) 715 may be used to determine the amount of resources for CQI/PMI, RI/PTI, and ACK/NACK separately. The amount of resources for UCI may further depend on the PUSCH parameters (e.g., modulation and coding scheme (MCS), bandwidth, etc.). In aspects of the present disclosure, when UCI for HRLLC (e.g., ACK/NACK, CSI, etc.) is piggy-backed on PUSCH resources 705, a separate set of parameters for determining the amount of resources for UCI may be introduced. For example, a first set of offsets 715-a may be used if the UCI is not for HRLLC, and a second set of offsets 715-b (e.g., which may be associated with a wider bandwidth) may be used if the UCI is for HRLLC services.

Additionally or alternatively, two or more offsets 715-a, 715-b, 715-c may be configured such that a UE 115 may determine (e.g., dynamically) which offset 715 is to be used for a given UCI transmission on PUSCH resources 705. Such a dynamic scheme may enable additional flexibility for a base station 105. In some cases, the determination may be done based on a determination of HRLLC compared to HRLLC PDSCH transmissions (i.e., the ACK/NACK corresponding to the PDSCH transmissions), an indicator in a DCI grant, etc. That is, for HRLLC PDSCH ACK/NACK piggy-backing on PUSCH resources 705, more ACK/NACK resources (e.g., offset 715-b) may be allocated based on a first RRC configuration while for non-HRLLC PDSCH ACK/NACK piggy-backing on PUSCH resources 705, a second RRC-configured offset (e.g., offset 715-a) may be used.

Figure 8:
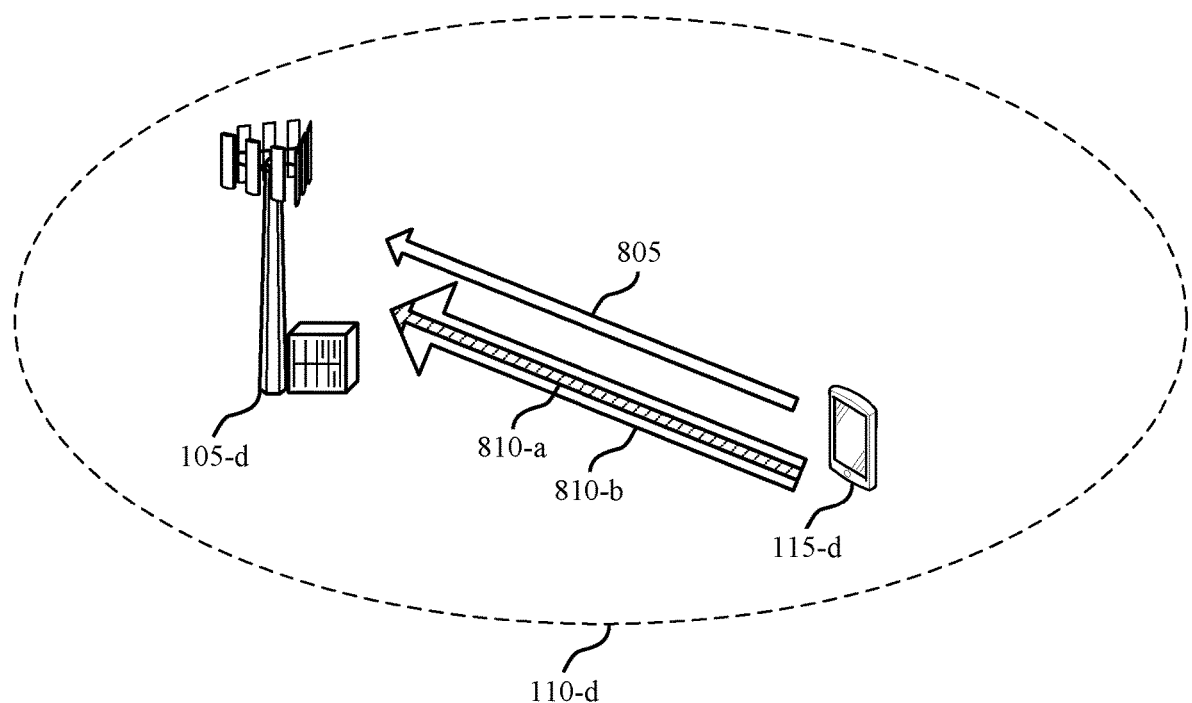
FIG. 8 illustrates an example of a wireless communication system that supports high reliability low latency configuration in accordance with aspects of the present disclosure.

FIG. 8 illustrates a wireless communication system 800 that supports UL power control enhancements in accordance with various aspects of the present disclosure. Wireless communication system 800 includes base station 105-d and UE 115-d, each of which may be an example of the corresponding device as described with reference to FIGS.

1, 2, and 6. In some cases, different open loop power control parameters may be used for HRLLC communications 810 compared to non-HRLLC communications 805, which may include communications according to earlier releases of the LTE standard, MBB communications, broadcast communications, or the like. For example, HRLLC-specific power control parameters (e.g., alpha for partial/full path loss compensation, P_0_PUSCH or P_0_PUCCH, etc.) may be separately indicated for HRLLC communications 810 and non-HRLLC communications 805.

Additionally or alternatively, UE-specific power control parameters (e.g., P_0_PUSCH or P_0_PUCCH, delta_TF, delta_F_PUCCH, etc.) may be separately configured for HRLLC communications 810 and non-HRLLC communications 805. In some examples, the determination of which set to use may be based on aspects of the HRLLC communications 810 and non-HRLLC communications 805 (e.g., an amount of data to be transmitted). For example, the different control parameters may allow for independent control of transmission power for HRLLC communications 810 and non-HRLLC communications 805 (e.g., such that UE 115-d may transmit HRLLC communication 810-a at a lower power initially before increasing the transmission power of HRLLC communication 810-b without necessarily altering the transmission power of non-HRLLC communication 805). In some cases, the total transmission power for UE 115-d may be limited (e.g., due to interference, battery constraints, etc.) such that the increase in transmission power from HRLLC communication 810-a to HRLLC communication 810-b may be at least partially offset by a complementary decrease in transmission power for non-HRLLC communication 805.

Analogous enhancements for closed/inner-loop power control are also considered. However, in some cases there may not be a strong need to introduce separate closed/inner loop power control for HRLLC communications 810 and non-HRLLC communications 805 (e.g., such that both may use the same closed loop power control). Similarly, there may not be a strong need to have backhaul-related enhancements (e.g., because the current backhaul framework may be sufficient to support the enhancements described herein).

Figure 9:
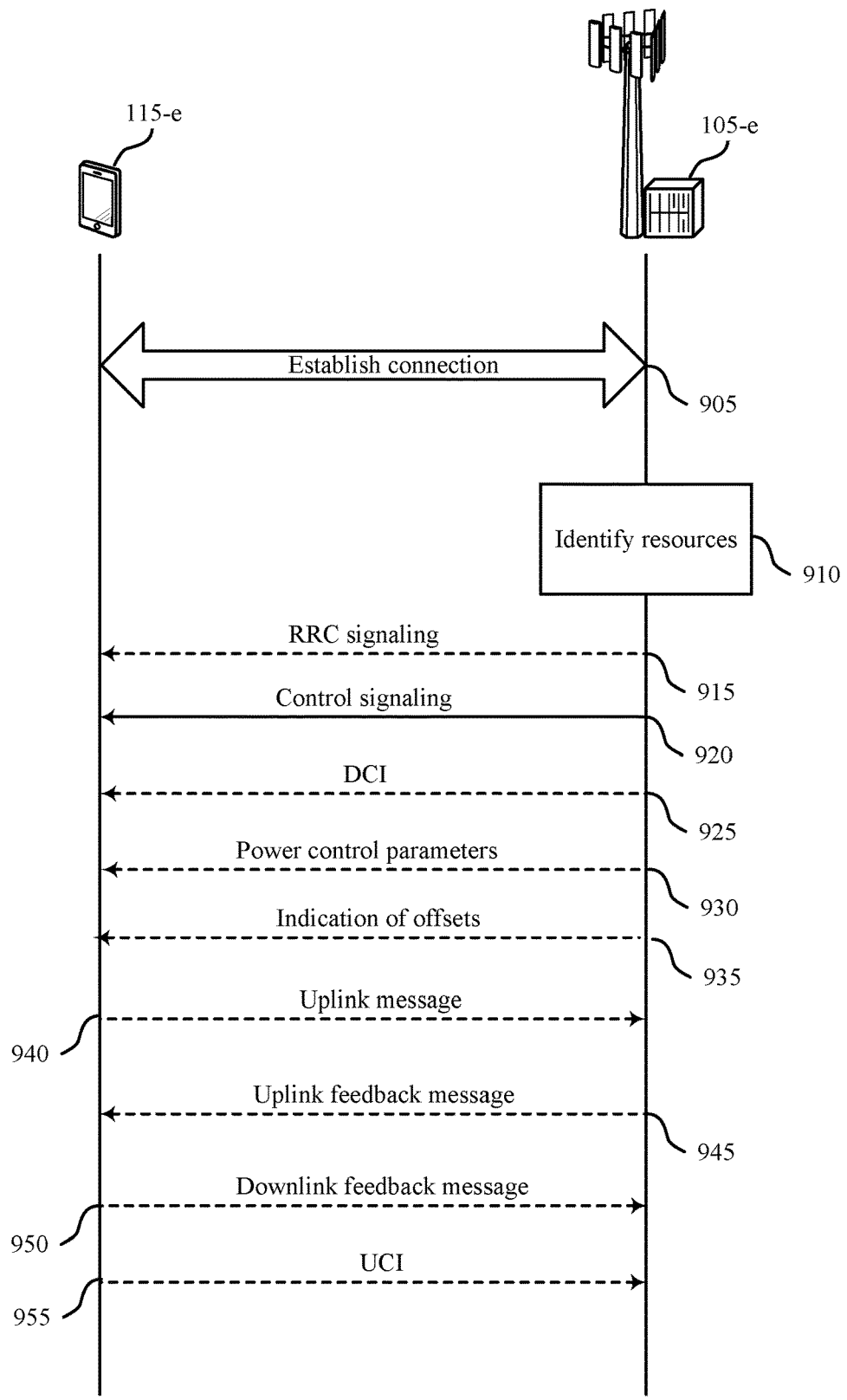
FIGS. 9 and 10 illustrate examples of process flows that support high reliability low latency configuration for wireless communications systems in accordance with aspects of the present disclosure.

FIG. 9 illustrates a process flow 900 that supports high reliability low latency configuration for wireless communications systems in accordance with various aspects of the present disclosure. Process flow 900 includes UE 115-e and base station 105-e, each of which may be an example of the corresponding device described with reference to FIG. 1.

At 905, base station 105-e may establish a connection with UE 115-e. The connection established at 905 may be an example of a communication link 125 as described with reference to FIG. 1. In some cases, the wireless communications system within which UE 115-e and base station 105-e establish the connection at 905 may support a first wireless service having a first target decoding error rate and a first target latency value and a second wireless service having a second target decoding error rate that is higher than the first target decoding error rate or a second target latency that is higher than the first target latency value. In some examples, the first wireless service may be for HRLLC. In some examples, the second wireless service may have both the second target decoding error rate and the second target latency value. In some examples, the second wireless service may have the second target decoding error rate and a third target latency value that is lower than the first target latency value. In some examples, the second wireless service may have a third target decoding error rate that is lower than the first target decoding error rate and the second target latency value.

At 910, base station 105-e may identify time-frequency resources for assignment to UE 115-e for the first wireless service, wherein the first wireless service and the second wireless service have TTIs of a same duration. In some cases, the TTIs are 1 ms. In various examples, the resources identified at 910 may depend on aspects of the wireless communication system such as a supported traffic load, processing capability of UE 115-e, an amount of a given type of traffic to be transmitted, etc. In some examples, the resources identified at 910 may depend on the first target decoding error rate.

At 915, base station 105-e may optionally transmit RRC signaling to UE 115-e to configure UE 115-e for the first wireless service.

At 920, base station 105-e may transmit a control message that assigns the resources identified at 910 for the first wireless service to UE 115-e during one of the TTIs. In some cases, the control message at 920 is transmitted based at least in part on configuring the UE 115-e for the first wireless service (e.g., using RRC signaling at 915). In some cases, the control message comprises at least one of a radio network temporary identifier (RNTI), a DCI format, a DCI indication, a set of control candidates, a semi-static configuration, or any combination thereof that indicates that the assigned resources are associated with the first wireless service.

At 925, base station 105-e may optionally transmit DCI associated with the first wireless service using a first set of candidates for the wireless service. In some examples, the first set of candidates for the wireless service may be identified in the control signaling at 920. In some cases, the number of aggregation levels for the first set of candidates may be different from a number of aggregation levels associated with a second set of candidates for the second wireless service.

At 930, base station 105-e may optionally transmit power control parameters to UE 115-a. In some examples, base station 105-e may transmit power control parameters associated with the first wireless service (e.g., HRLCC power control parameters) or with the second wireless service (e.g., non-HRLCC power control parameters).

At 935, base station 105-e may optionally transmit an indication of a first set of offsets to UE 115-a to be used for piggy-backing UCI with a PUSCH message associated with the first wireless service, and/or an indication of a second set of offsets to be used for piggy-backing UCI with a PUSCH message associated with the second wireless service. In some cases, the indication of the set of offsets is transmitted via either the DCI (e.g., at 925) or RRC signaling (e.g., at 915).

At 940, base station 105-e may optionally receive, from UE 115-e, a data message of the first wireless service on the assigned resources for the first wireless service (e.g., the resources identified at 910).

At 945, base station 105-e may optionally transmit an uplink feedback message that comprises HARQ feedback using spatial, time-domain, or frequency-domain bundling from UE 115-e in response to the data message. In this example, uplink feedback refers to feedback for an uplink transmission rather than indicating that the feedback is transmitted in the uplink direction. In some cases, a set of time-frequency resources for one of the two or more sets of feedback resources is different from a set of time-frequency resources for another of the two or more sets of feedback resources.

At 950, base station 105-*e* may optionally receive a downlink feedback message that comprises a bundle of one or more ACK messages or one or more NACK messages from UE 115-*e*. In some cases, the downlink feedback (e.g., HARQ feedback sent from a UE to base station 105-*e* in response to a downlink transmission) comprises a ACK/NAK bits and a scheduling request. In some cases, the downlink feedback message includes no CSI feedback. In some cases, the downlink feedback message includes CSI feedback without a CQI. In some cases, an amount of CQI information included in the CSI feedback associated with the first wireless service is different than an amount of CQI information included in the CSI feedback associated with the second wireless service.

At 955, base station 105-*e* may optionally receive UCI for the first wireless service concurrently with a PUSCH message from UE 115-*e*. For example UCI for the first wireless service may be piggy-backed with a PUSCH message. In some cases, UCI may be piggy-based with a PUSCH message in accordance with the first set of offsets received at 935. In some examples, the UCI for the first wireless service comprises a different set of parameters than UCI for the second wireless service.

Figure 10:
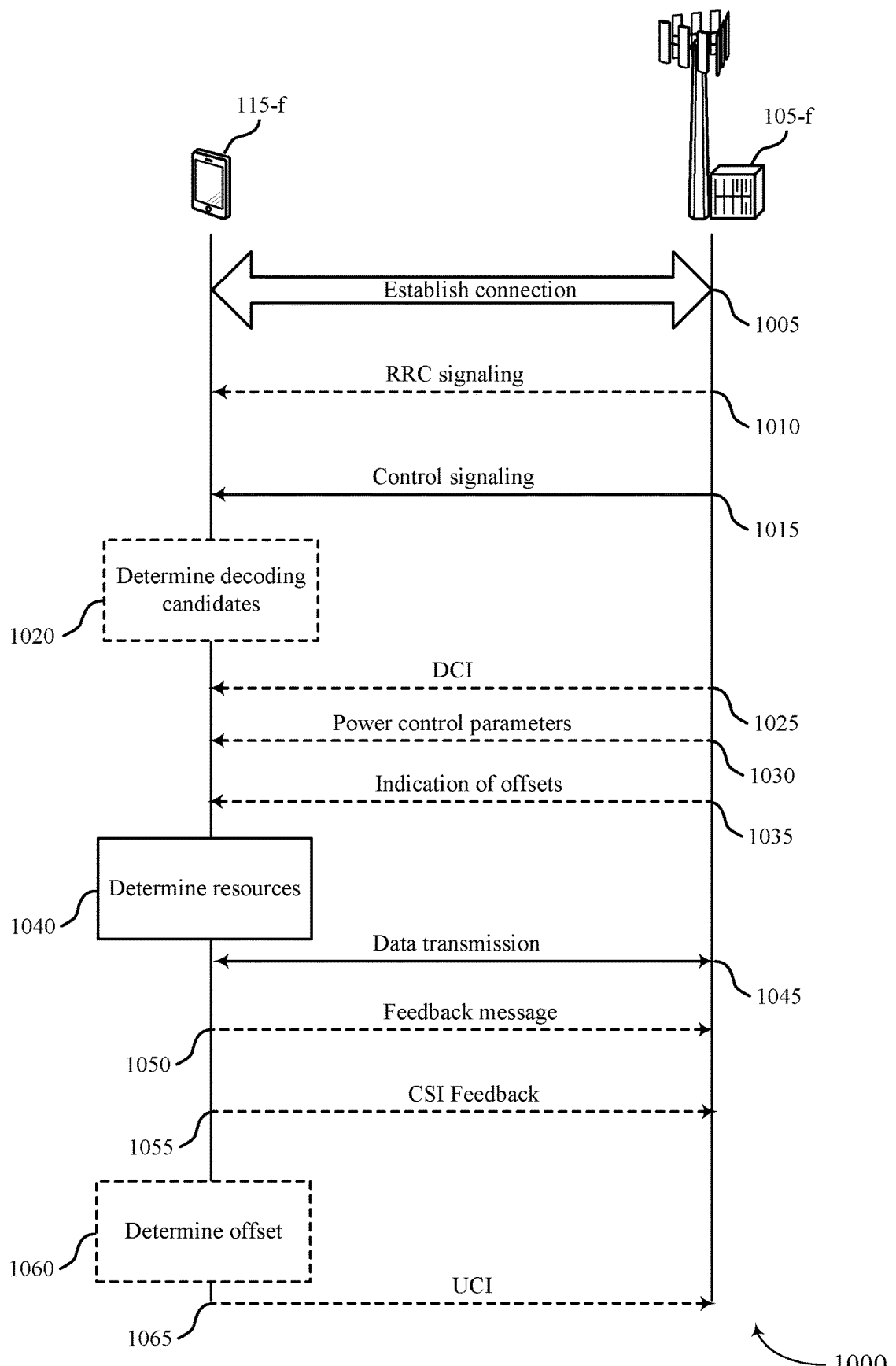

FIG. 10 illustrates a process flow 1000 that supports high reliability low latency configuration for wireless communications systems in accordance with various aspects of the present disclosure. Process flow 1000 includes UE 115-*f* and base station 105-*f*, each of which may be an example of the corresponding device described with reference to FIG. 1.

At 1005, base station 105-*f* may establish a connection with UE 115-*f*. The connection established at 1005 may be an example of a communication link 125 as described with reference to FIG. 1. In some cases, the wireless communications system within which UE 115-*f* and base station 105-*f* establish the connection at 1005 may support a first wireless service having a first target decoding error rate and a first target latency value and a second wireless service having a second target decoding error rate that is higher than the first target decoding error rate or a second target latency value that is higher than the first target latency value. In some examples, the first wireless service may be for HRLLC. In some examples, the second wireless service may have the second target decoding error rate and the second target latency rate. In some examples, the second wireless service may have the second target decoding error rate and a third target latency value that is lower than the first target latency value. In some examples, the second wireless service may have a third target decoding error rate that is lower than the first target decoding error rate and the second target latency value.

At 1010, UE 115-*f* may optionally receive RRC signaling from base station 105-*f* that configures UE 115-*f* to monitor for resource assignments for the first wireless service. In some cases, the UE 115-*f* may receive RRC signaling (e.g., at 1010 or at some other time) that configures the UE 115-*f* to monitor for resource assignments for the second wireless service. In some examples, the second wireless service may be associated with a latency that is less than a latency associated with the first wireless service (e.g., such that the first wireless service may be associated with a higher reliability and a higher latency). Additionally or alternatively, the configuration of UE 115-*f* may be based at least in part on a TA for UE 115-*f* and/or a transport block size (TBS) limitation.

At 1015, UE 115-*f* may receive, during a first TTI, a control message from base station 105-*f*. In examples, the first and second wireless services may have a same TTI duration. In some cases, the UE 115-*f* may receive the control message based at least in part on receiving the RRC signaling at 1010. In some cases, the first TTI comprises a LTE subframe. In some cases, the control message comprises at least one of a RNTI, a DCI format, a DCI indication, a set of control candidates, a semi-static configuration, or any combination thereof that indicates that the assigned resources are associated with the first wireless service.

At 1020, UE 115-*f* may optionally determine a first set of decoding candidates within a UESS based at least in part on the control message received at 1015.

At 1025, UE 115-*f* may receive, from base station 105-*f*, DCI using the first set of decoding candidates determined at 1020.

At 1030, UE 115-*f* may optionally receive a first set of UE-specific power control parameters, wherein the first set of power control parameters is associated with the first wireless service, and may receive a second set of UE-specific power control parameters, wherein the second set of power control parameters is associated with the second wireless service.

At 1035, UE 115-*f* may optionally receive a first indication of a first set of offsets to be used for piggy-backing UCI with a PUSCH message, wherein the PUSCH message is associated with the first wireless service. In some cases, at 1030 UE 115-*f* may optionally receive a first indication of a first offset to be used for piggy-backing UCI with a first PUSCH message, wherein the first PUSCH message is associated with the first wireless service, and may optionally receive a second indication of a second offset to be used for piggy-backing UCI with a second PUSCH message, wherein the second PUSCH message is associated with the second wireless service. In some cases, the first indication is received via either DCI (e.g., at 1025) or RRC signaling (e.g., at 1010).

At 1040, UE 115-*f* may determine resources assigned for the first wireless service based at least in part on the control message received at 1015. In some cases, the resources may be determined based at least in part on the DCI received at 1025.

At 1045, UE 115-*f* may receive data during the first TTI or transmit data during a second TTI using the resources assigned for the first wireless service. In some cases, UE 115-*f* may transmit UCI piggybacked with a PUSCH message. In some cases, the UCI is piggy-backed with the PUSCH message in accordance with the first set of offsets received at 1035. In some cases, the UCI for the first wireless service comprises a different set of parameters than UCI for the second wireless service.

At 1050, UE 115-*f* may optionally transmit a feedback message responsive to at least the control message and based at least in part on a success of receiving data for the first wireless service during the first TTI. In some cases, the feedback message comprises HARQ feedback transmitted using spatial bundling, time-domain bundling, or frequency-domain bundling, as described herein. Bundling for the first wireless service may be different from bundling for the second wireless service. In some examples, transmitting the feedback message comprises transmitting at least one of an ACK or NACK within a predetermined time period following the first TTI. In some cases, the predetermined time period comprises at least three TTIs. In some cases, the feedback message includes no CSI feedback. In some cases, the feedback message includes CSI feedback without a CQI.

At 1055, UE 115-f may optionally transmit a first set of CSI feedback associated with the first wireless service, and transmit a second set of feedback associated with the second wireless service. In some cases the first set of CSI feedback and the second set of CSI feedback differ in an amount of CQI information included in each of the first set of CSI feedback and the second set of CSI feedback.

At 1060, UE-115-f may optionally determine whether to use the first offset or the second offset for piggy-backing the UCI with a PUSCH message. In some cases, the determination may be based at least in part on the control message received at 1015.

Figure 11:
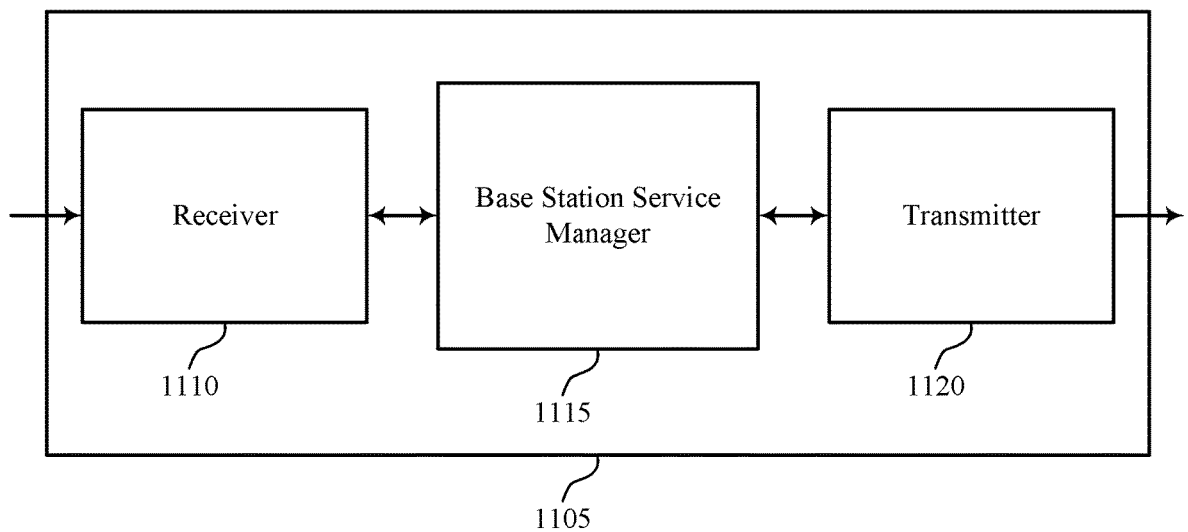
FIGS. 11 through 13 show block diagrams of a device or devices that support high reliability low latency configuration for wireless communications systems in accordance with aspects of the present disclosure.

At 1065, UE-115-f may optionally transmit UCI. In some cases, the UCI may be piggy-backed with a PUSCH message in accordance with the first set of offsets. In some cases, in accordance with a determination at 1060 to use the first offset, the UCI may be piggy-backed with a PUSCH message in accordance with the first offset FIG. 11 shows a block diagram 1100 of a wireless device 1105 that supports high reliability low latency configuration for wireless communications systems in accordance with aspects of the present disclosure. Wireless device 1105 may be an example of aspects of a base station 105 as described with reference to FIG. 1. Wireless device 1105 may include receiver 1110, base station service manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to high reliability low latency configuration for wireless communications systems, etc.). Information may be passed on to other components of the device. The receiver 1110 may be an example of aspects of the transceiver 1435 described with reference to FIG. 14. The receiver 1110 may utilize a single antenna or a set of antennas.

Base station service manager 1115 may be an example of aspects of the base station service manager 1415 described with reference to FIG. 14. Base station service manager 1115 may identify resources for assignment to a user equipment UE for the first wireless service, where the first wireless service and the second wireless service have TTIs of a same duration. Base station service manager 1115 or at least some of its various sub-components may be implemented in hardware, software executed by a processor, firmware, or any combination thereof. If implemented in software executed by a processor, the functions of the base station service manager 1115 or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station service manager 1115 and/or at least some of its various sub-components may be physically located at various positions, including being distributed such that portions of functions are implemented at different physical locations by one or more physical devices. In some examples, base station service manager 1115 or at least some of its various sub-components may be a separate and distinct component in accordance with various aspects of the present disclosure. In other examples, base station service manager 1115 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 1120 may transmit signals generated by other components of the device. Transmitter 1120 may transmit a control message that assigns the resources for the first wireless service to the UE during one of the TTIs. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
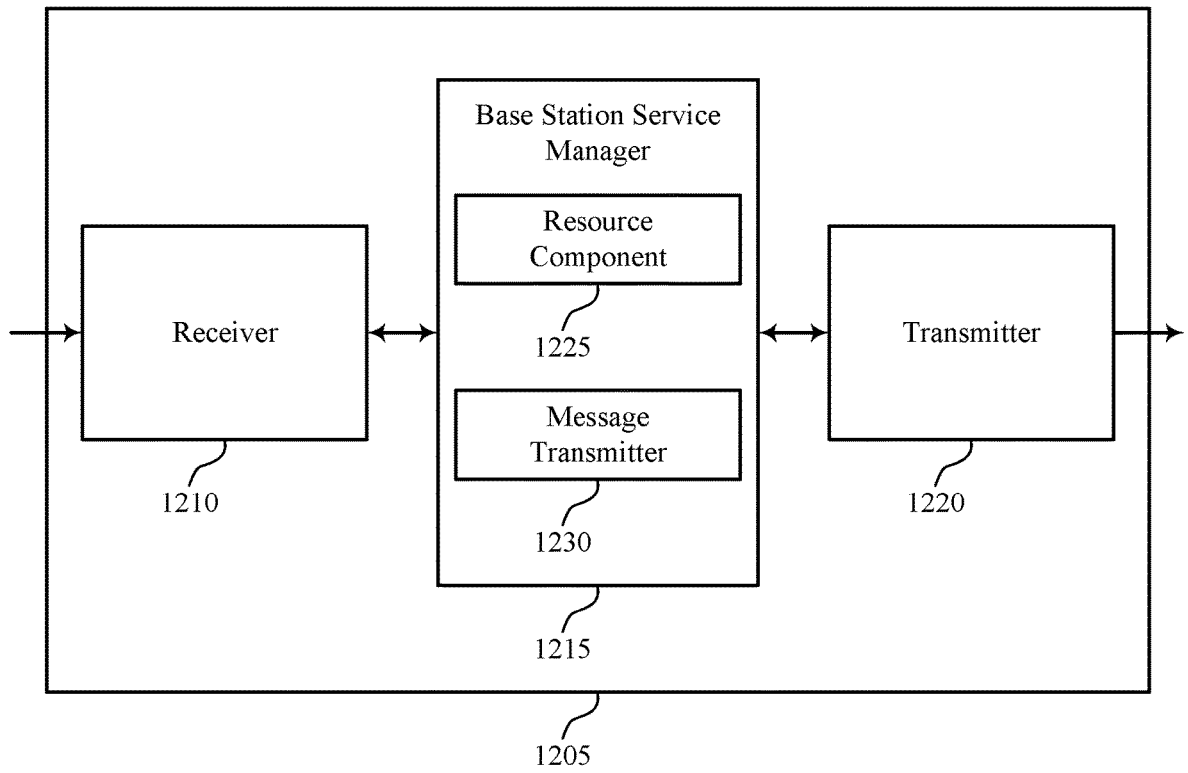

FIG. 12 shows a block diagram 1200 of a wireless device 1205 that supports high reliability low latency configuration for wireless communications systems in accordance with aspects of the present disclosure. Wireless device 1205 may be an example of aspects of a wireless device 1105 or a base station 105 as described with reference to FIGS. 1 and 11. Wireless device 1205 may include receiver 1210, base station service manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to high reliability low latency configuration for wireless communications systems, etc.). Information may be passed on to other components of the device. The receiver 1210 may be an example of aspects of the transceiver 1435 described with reference to FIG. 14. The receiver 1210 may utilize a single antenna or a set of antennas.

Base station service manager 1215 may be an example of aspects of the base station service manager 1415 described with reference to FIG. 14. Base station service manager 1215 may also include resource component 1225 and message transmitter 1230.

Resource component 1225 may identify resources for assignment to a UE for the first wireless service, where the first wireless service and the second wireless service have TTIs of a same duration. In some cases, the second wireless service has a second target latency value that is higher than the first target latency value. In some cases, the second wireless service has a third target latency value that is lower than the first target latency value.

Message transmitter 1230 may, in combination with transmitter 1220, generate and transmit a control message that assigns the resources for the first wireless service to the UE during one of the TTIs. Message transmitter 1230 may be a sequence generator, for example. In some cases, the control message includes at least one of a RNTI, a DCI format, a DCI indication, a set of control candidates, a semi-static configuration, or any combination thereof that indicates that the assigned resources are associated with the first wireless service.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
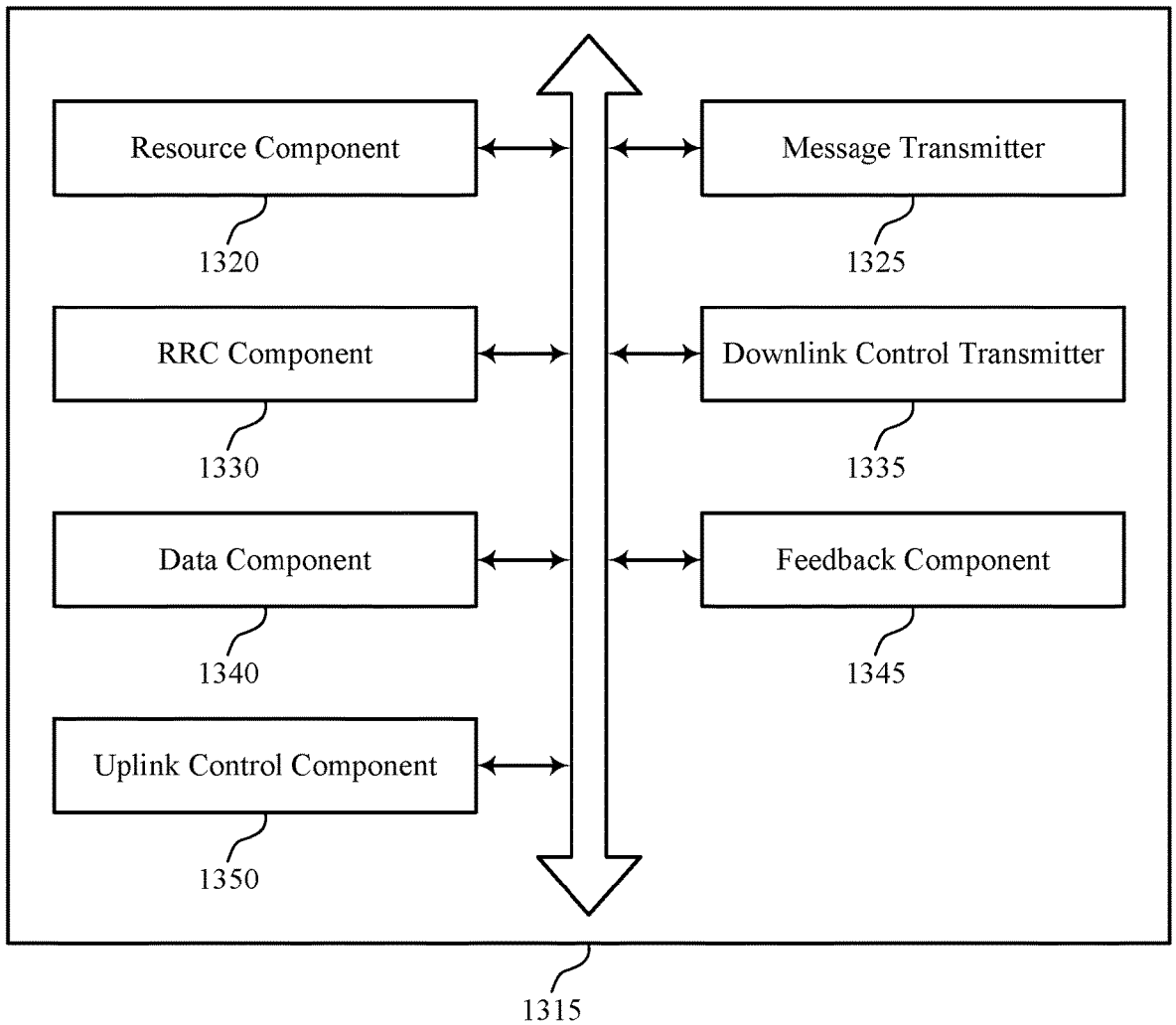

FIG. 13 shows a block diagram 1300 of a base station service manager 1315 that supports high reliability low latency configuration for wireless communications systems in accordance with aspects of the present disclosure. The base station service manager 1315 may be an example of aspects of a base station service manager 1115, a base station service manager 1215, or a base station service manager 1415 described with reference to FIGS. 11, 12, and 14. The base station service manager 1315 may include resource component 1320, message transmitter 1325, RRC component 1330, downlink control transmitter 1335, data component 1340, feedback component 1345, and uplink control component 1350. Each of these modules may communicate, directly or indirectly, with one another (e.g., via one or more buses).

Resource component 1320 may identify resources for assignment to a UE for the first wireless service, where the first wireless service and the second wireless service have TTIs of a same duration. In some cases, the first wireless service has a first target latency value and the second wireless service has a second target latency value that is higher than the first target latency value. In some cases, the first wireless service has a first target latency value and the second wireless service has a third target latency value that is lower than the first target latency value. Resource component 1320 may optionally identify second resources for assignment to a UE for the second wireless service. In some cases, resource component 1320 identifies the resources by selecting resources based at least in part on the first target decoding error rate or the first target latency value of the first wireless service. In some cases, resource component 1320 identifies the second resources by selecting second resources based at least in part on the second target decoding rate or the second target latency value of the second wireless service.

Message transmitter 1325 may, in combination with a transmitter or transceiver, generate and transmit a control message that assigns the resources for the first wireless service to the UE during one of the TTIs. In some cases, the control message includes at least one of a first RNTI, a first DCI format, a first DCI indication, a first set of control candidates, a first semi-static configuration, or any combination thereof that indicates that the assigned resources are associated with the first wireless service. Message transmitter 1325 may optionally, in combination with a transmitter or transceiver, generate and transmit a second control message that assigns the resources for the second wireless service to the UE during one of the TTIs. In some cases, the second control message includes at least one of a second RNTI, a second DCI format, a second DCI indication, a second set of control candidates, a second semi-static configuration, or any combination thereof that indicates that the assigned resources are associated with the second wireless service.

RRC component 1330 may, in combination with a transmitter or transceiver, generate and transmit, to the UE, RRC signaling that configures the UE for the first wireless service, where the control message is transmitted based on configuring the UE for the first wireless service.

Downlink control transmitter 1335 may, in combination with a transmitter or transceiver, generate and transmit downlink control information associated with the first wireless service using a first set of decoding candidates for the first wireless service. In some cases, a number of aggregation levels for the first set of decoding candidates is different from a number of aggregation levels associated with a second set of decoding candidates for the second wireless service. In some cases, downlink control transmitter 1335 may transmit, to the UE, a first indication of a first set of offsets to be used for piggy-backing uplink control information with a PUSCH message associated with the first wireless service, and transmit, to the UE, a second indication of a second set of offsets to be used for piggy-backing uplink control information with a second PUSCH message associated with the second wireless service. In some cases, downlink control transmitter 1335 may transmit, to the UE, a first set of power control parameters associated with the first wireless service, and a second set of power control parameters associated with the second wireless service.

Data component 1340 may, in combination with a receiver or transceiver, receive, from the UE, a data message of the first wireless service on the assigned resources for the first wireless service.

Feedback component 1345 may, in combination with a transmitter or transceiver, generated and transmit a feedback message to the UE that includes ACK/NAK bundling (e.g., spatial bundling, time-domain bundling, or frequency-domain bundling) in response to the data message and receive, from the UE, a feedback message responsive to the control message that is transmitted using spatial bundling, time-domain bundling, or frequency-domain bundling, as described herein. Bundling for the first wireless service may be different from bundling for the second wireless service. In some cases, the feedback message from the UE includes a scheduling request. In some cases, the feedback message from the UE does not include channel state information (CSI) feedback. In some cases, the feedback message from the UE includes CSI feedback without a channel quality indicator (CQI). In some cases, feedback component 1345 may receive, from the UE, a first set of channel state information (CSI) feedback associated with the first wireless service, and a second set of CSI feedback associated with the second wireless service. In some cases the first set of CSI feedback and the second set of CSI feedback differ in the amount of channel quality indicator (CQI) information that is included in the first and second sets of CSI feedback. In some cases, the first set of CSI feedback is associated with a first set of interference hypotheses and the second set of CSI feedback is associated with a second set of interference hypotheses.

Uplink control component 1350 may, in combination with a receiver or transceiver, receive, from the UE, uplink control information for the first wireless service concurrently or piggybacked with a PUSCH message. In some cases, the uplink control information for the first wireless service includes a different set of parameters than uplink control information for the second wireless service.

Figure 14:
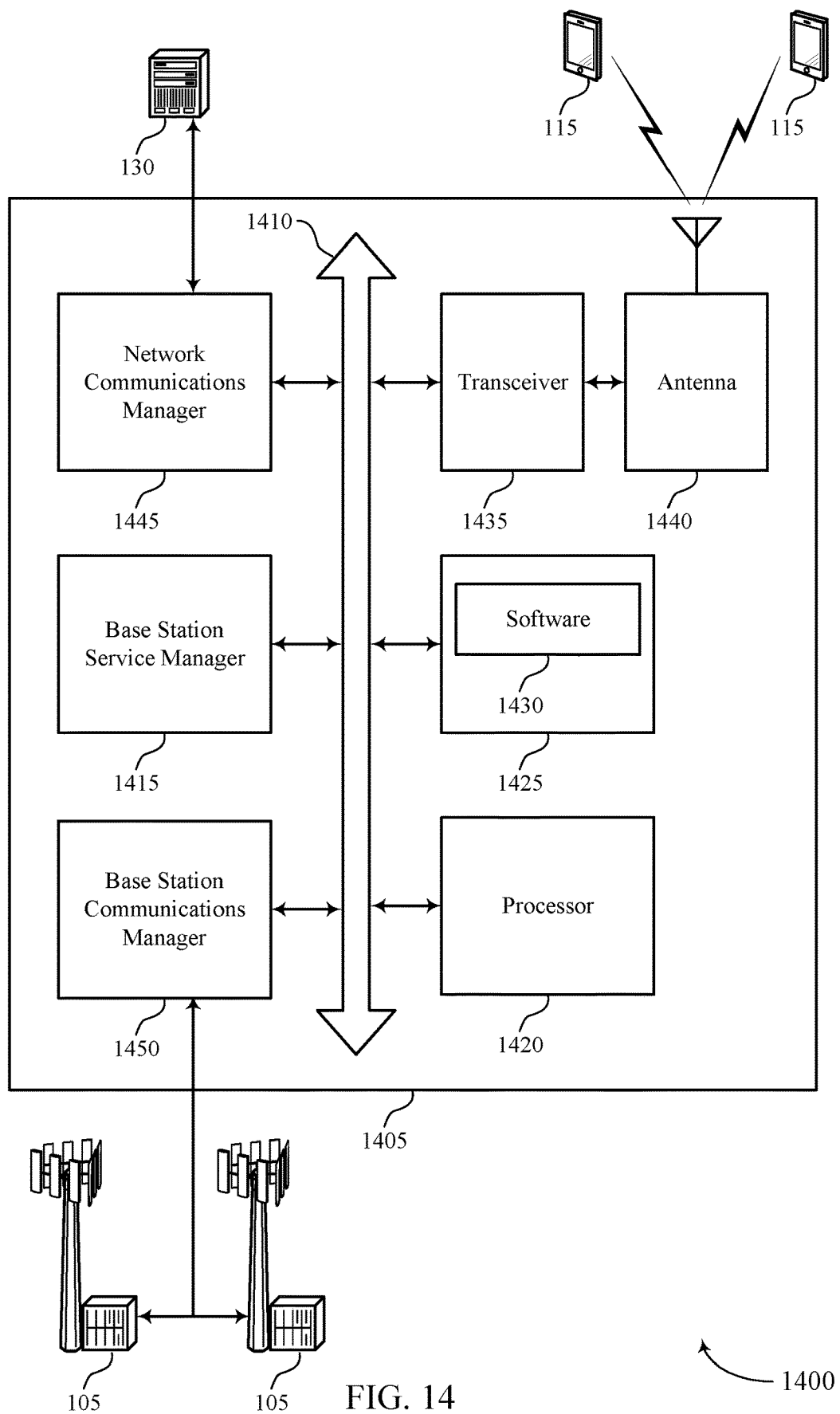
FIG. 14 illustrates a block diagram of a system including a base station that supports high reliability low latency configuration for wireless communications systems in accordance with aspects of the present disclosure.

FIG. 14 shows a diagram of a system 1400 including a device 1405 that supports high reliability low latency configuration for wireless communications systems in accordance with aspects of the present disclosure. Device 1405 may be an example of or include the components of wireless device 1105, wireless device 1205, or a base station 105 as described above, e.g., with reference to FIGS. 1, 11 and 12. Device 1405 may include components for bi-directional voice and data communications including components for transmitting and receiving communications, including base station service manager 1415, processor 1420, memory 1425, software 1430, transceiver 1435, antenna 1440, network communications manager 1445, and base station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting high reliability low latency configuration for wireless communications systems).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware and/or software operation such as the interaction with peripheral components or devices.

Software 1430 may include code to implement aspects of the present disclosure, including code to support high reliability low latency configuration for wireless communications systems. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A wireless communication network technology to provide communication between base stations 105.

Figure 15:
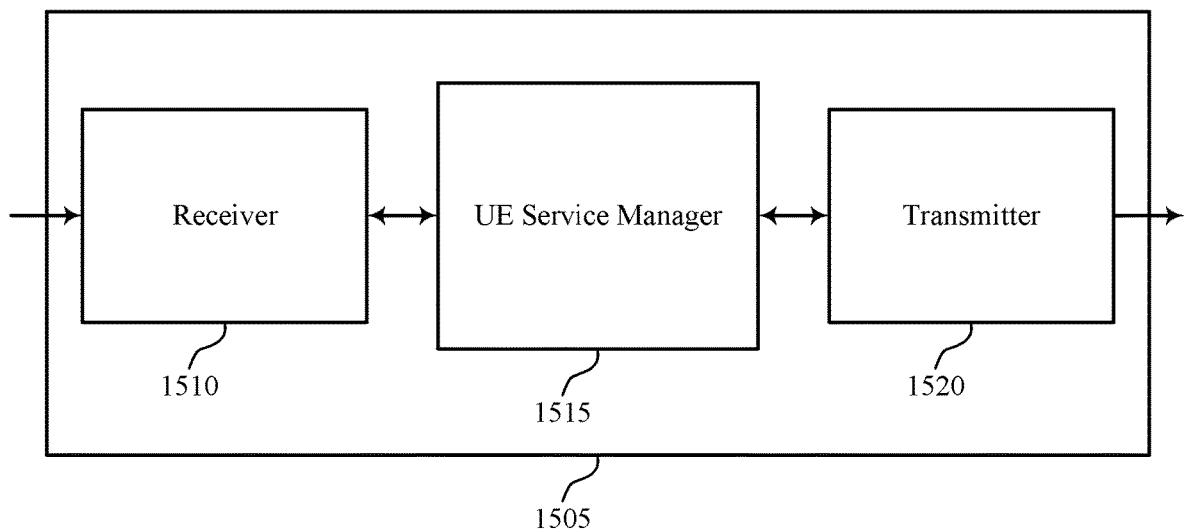
FIGS. 15 through 17 show block diagrams of a device or devices that support high reliability low latency configuration for wireless communications systems in accordance with aspects of the present disclosure.

FIG. 15 shows a block diagram 1500 of a wireless device 1505 that supports high reliability low latency configuration for wireless communications systems in accordance with aspects of the present disclosure. Wireless device 1505 may be an example of aspects of a UE 115 as described with reference to FIG. 1. Wireless device 1505 may include receiver 1510, UE service manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to high reliability low latency configuration for wireless communications systems, etc.). Receiver 1510 may receive, at a UE and during a first TTI, a control message from a base station, where the first wireless service and the second wireless service have TTIs of a same duration. Receiver 1510 may also receive data during the first TTI. Information may be passed on to other components of the device. Receiver 1510 may be an example of aspects of the transceiver 1835 described with reference to FIG. 18. The receiver 1510 may utilize a single antenna or a set of antennas.

UE service manager 1515 may be an example of aspects of the UE service manager 1815 described with reference to FIG. 18. UE service manager 1515 may determine resources assigned for the first wireless service based on the control message. UE service manager 1515 or at least some of its various sub-components may be implemented in hardware, software executed by a processor, firmware, or any combination thereof. If implemented in software executed by a processor, the functions of the UE service manager 1515 or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE service manager 1515 or at least some of its various sub-components may be physically located at various positions, including being distributed such that portions of functions are implemented at different physical locations by one or more physical devices. In some examples, UE service manager 1515 or at least some of its various sub-components may be a separate and distinct component in accordance with various aspects of the present disclosure. In other examples, UE service manager 1515 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 1520 may transmit signals generated by other components of the device. Transmitter 1520 may transmit data during a second TTI using the resources assigned for the first wireless service. In some examples, the transmitter 1520 may be collocated with a receiver 1510 in a transceiver module. For example, the transmitter 1520 may be an example of aspects of the transceiver 1835 described with reference to FIG. 18. The transmitter 1520 may utilize a single antenna or a set of antennas.

Figure 16:
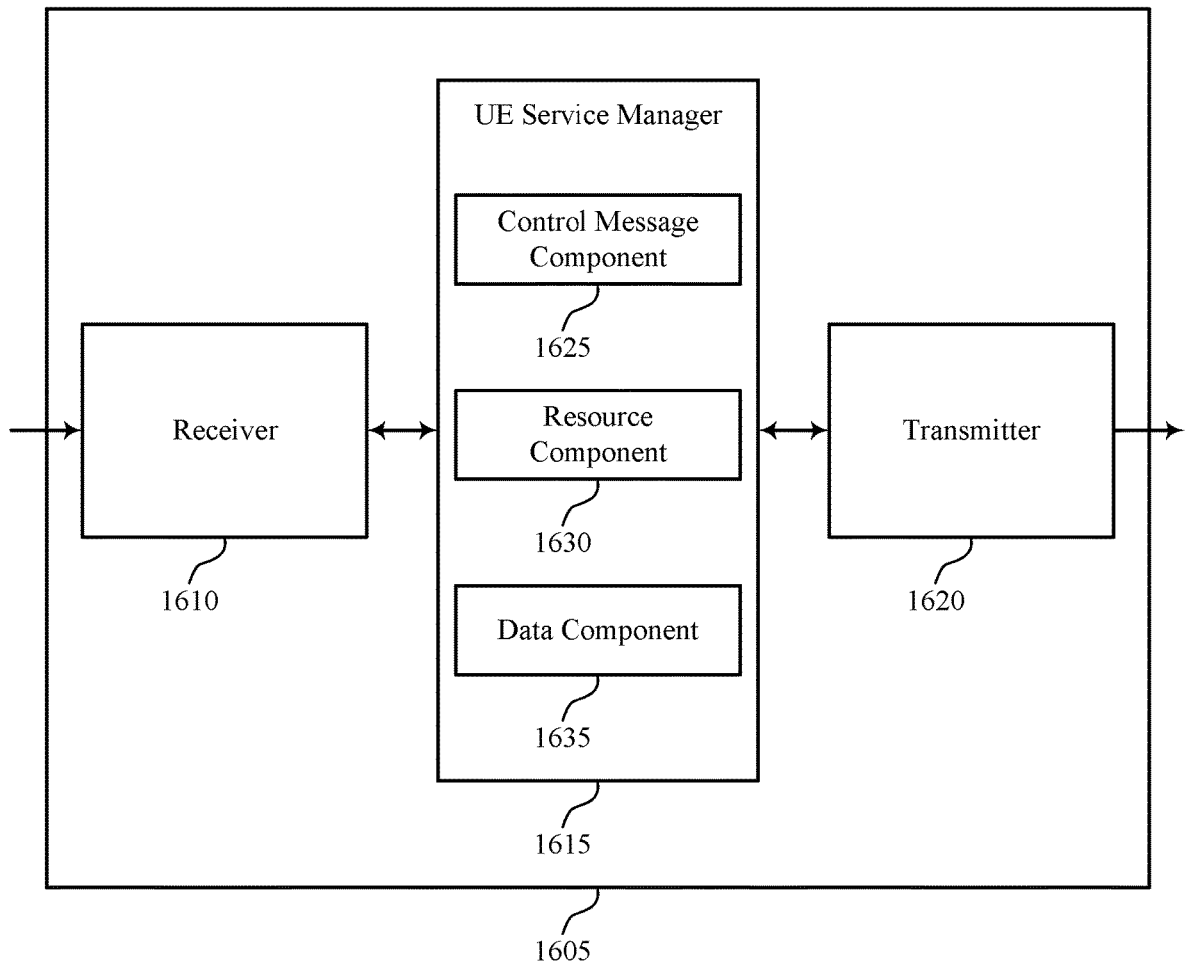

FIG. 16 shows a block diagram 1600 of a wireless device 1605 that supports high reliability low latency configuration for wireless communications systems in accordance with aspects of the present disclosure. Wireless device 1605 may be an example of aspects of a wireless device 1505 or a UE 115 as described with reference to FIGS. 1 and 15. Wireless device 1605 may include receiver 1610, UE service manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to high reliability low latency configuration for wireless communications systems, etc.). Information may be passed on to other components of the device. The receiver 1610 may be an example of aspects of the transceiver 1835 described with reference to FIG. 18. The receiver 1610 may utilize a single antenna or a set of antennas.

UE service manager 1615 may be an example of aspects of the UE service manager 1815 described with reference to FIG. 18. UE service manager 1615 may also include control message component 1625, resource component 1630, and data component 1635.

Control message component 1625 may, in combination with receiver 1610, receive, at a UE and during a first TTI, a control message from a base station, where the first wireless service and the second wireless service have TTIs of a same duration. In some cases, the control message includes at least one of a RNTI, a DCI format, a DCI indication, a set of control candidates, a semi-static configuration, or any combination thereof that indicates that the assigned resources are associated with the first wireless service. Control message component 1625 may optionally receive, at the UE and during a third TTI, a second control message from the base station. In some cases, the second control message includes at least one of a second RNTI, a second DCI format, a second DCI indication, a second set of control candidates, a second semi-static configuration, or any combination thereof that indicates that the assigned resources are associated with the second wireless service.

Resource component 1630 may determine resources assigned for the first wireless service based on the control message. In some cases, the first wireless service has a first target latency value and the second wireless service has a second target latency value that is higher than the first target latency value.

Data component 1635 may, in combination with receiver 1610, receive data during the first TTI or third TTI or, in combination with transmitter 1620, transmit data during a second TTI or fourth TTI using the resources assigned for the first wireless service or second wireless service, respectively. In some cases, the first TTI includes a LTE subframe.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1835 described with reference to FIG. 18. The transmitter 1620 may utilize a single antenna or a set of antennas.

Figure 17:
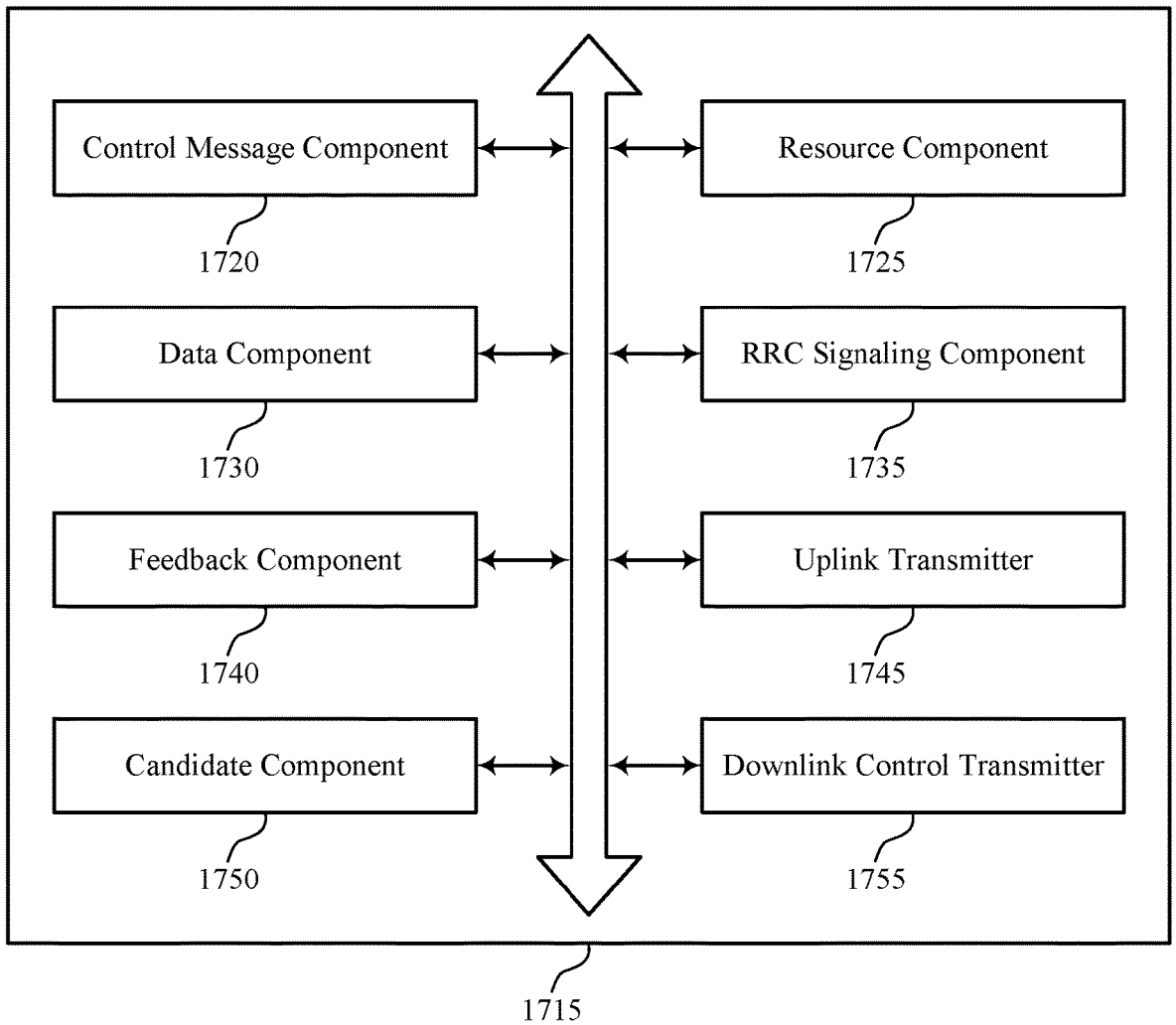

FIG. 17 shows a block diagram 1700 of a UE service manager 1715 that supports high reliability low latency configuration for wireless communications systems in accordance with aspects of the present disclosure. The UE service manager 1715 may be an example of aspects of a UE service manager 1815 described with reference to FIGS. 15, 16, and 18. The UE service manager 1715 may include control message component 1720, resource component 1725, data component 1730, RRC signaling component 1735, feedback component 1740, candidate component 1745, downlink control transmitter 1750, and uplink transmitter 1755. Each of these modules may communicate, directly or indirectly, with one another (e.g., via one or more buses).

Control message component 1720 may, in combination with a receiver or transceiver, receive, at a UE and during a first TTI, a control message from a base station, where the first wireless service and the second wireless service have TTIs of a same duration. In some cases, the control message includes at least one of a RNTI, a DCI format, a DCI indication, a set of control candidates, a semi-static configuration, or any combination thereof that indicates that the assigned resources are associated with the first wireless service. Control message component 1720 may optionally, in combination with a receiver or transceiver, receive, at a UE and during a third TTI, a second control message from the base station, where the second control message includes at least one of a second RNTI, a second DCI format, a second DCI indication, a second set of control candidates, a second semi-static configuration, or any combination thereof that indicates that the assigned resources are associated with the second wireless service. Control message component 1720 may optionally receive a first set of UE-specific power control parameters associated with the first wireless service and a second set of UE-specific power control parameters associated with the second wireless service.

Resource component 1725 may determine resources assigned for the first wireless service based on the control message. In some cases, the first wireless service has a first target latency value and the second wireless service has a second target latency value that is higher than the first target latency value. In some cases, the first wireless service has a first target latency value and the second wireless service has a third target latency value that is lower than the first target latency value.

Data component 1730 may, in combination with a receiver or transceiver, receive data during the first or third TTI or transmitting data during a second or fourth TTI using the resources assigned for the first wireless service or second wireless service, respectively. In some cases, the first TTI includes a LTE subframe.

RRC signaling component 1735 may, in combination with a receiver or transceiver, receive RRC signaling that configures the UE to monitor for resource assignments for the first wireless service, where the control message is received based on receiving the RRC signaling. RRC signaling component 1735 may optionally receive RRC signaling that configures the UE to monitor for resource assignments for the second wireless service. In some cases, the second wireless service has a second target latency value that is higher than the first target latency value of the first wireless service. In some cases, the second wireless service has a third target latency value that is lower than the first target latency value of the first wireless service. In some cases, the configuration of the UE is based on a timing advance for the UE or a TBS limitation. RRC signaling component 1735 may optionally receive, via RRC signaling, a first indication of a first set of offsets to be used for piggybacking the UCI with a PUSCH message associated with the first wireless service.

Feedback component 1740 may, in combination with a transmitter or transceiver, transmit a feedback message responsive to the control message based on a success of receiving data for the first wireless service during the first TTI. In some cases, the feedback message comprises HARQ feedback transmitted using spatial bundling, time-domain bundling, or frequency-domain bundling, as described herein. Bundling for the first wireless service may be different from bundling for the second wireless service. In some cases, the feedback message includes no CSI feedback. In some cases, the feedback message includes CSI feedback without a CQI. Feedback component 1740 may optionally transmit a first set of CSI feedback associated with the first wireless service and a second set of CSI feedback associated with the second wireless service. In some cases, the first set of CSI feedback and the second set of CSI feedback differ in an amount of CQI information that is included in the first set and the second set.

In some cases, transmitting the feedback message includes transmitting at least one of an ACK message or a NACK within a predetermined time period following the first TTI. In some cases, the predetermined time period includes at least three TTIs.

Candidate component 1745 may determine a first set of decoding candidates within a UE-specific search space based on the control message.

Downlink control component 1750 may, in combination with a receiver or transceiver, receive, from the base station, DCI using the first set of decoding candidates, where determining resources assigned for the first wireless service is based on the DCI. Downlink control component 1750 may optionally receive, via DCI, a first indication of a first set of offsets to be used for piggybacking the UCI with a PUSCH message associated with the first wireless service.

Uplink transmitter 1755 may, in combination with a transmitter or transceiver, transmit uplink control information (UCI) piggybacked with a PUSCH message. In some cases, the uplink control information for the first wireless service includes a different set of parameters than uplink control information for the second wireless service. In some cases, the UCI is piggybacked with the PUSCH message in accordance with the first set of offsets.

Figure 18:
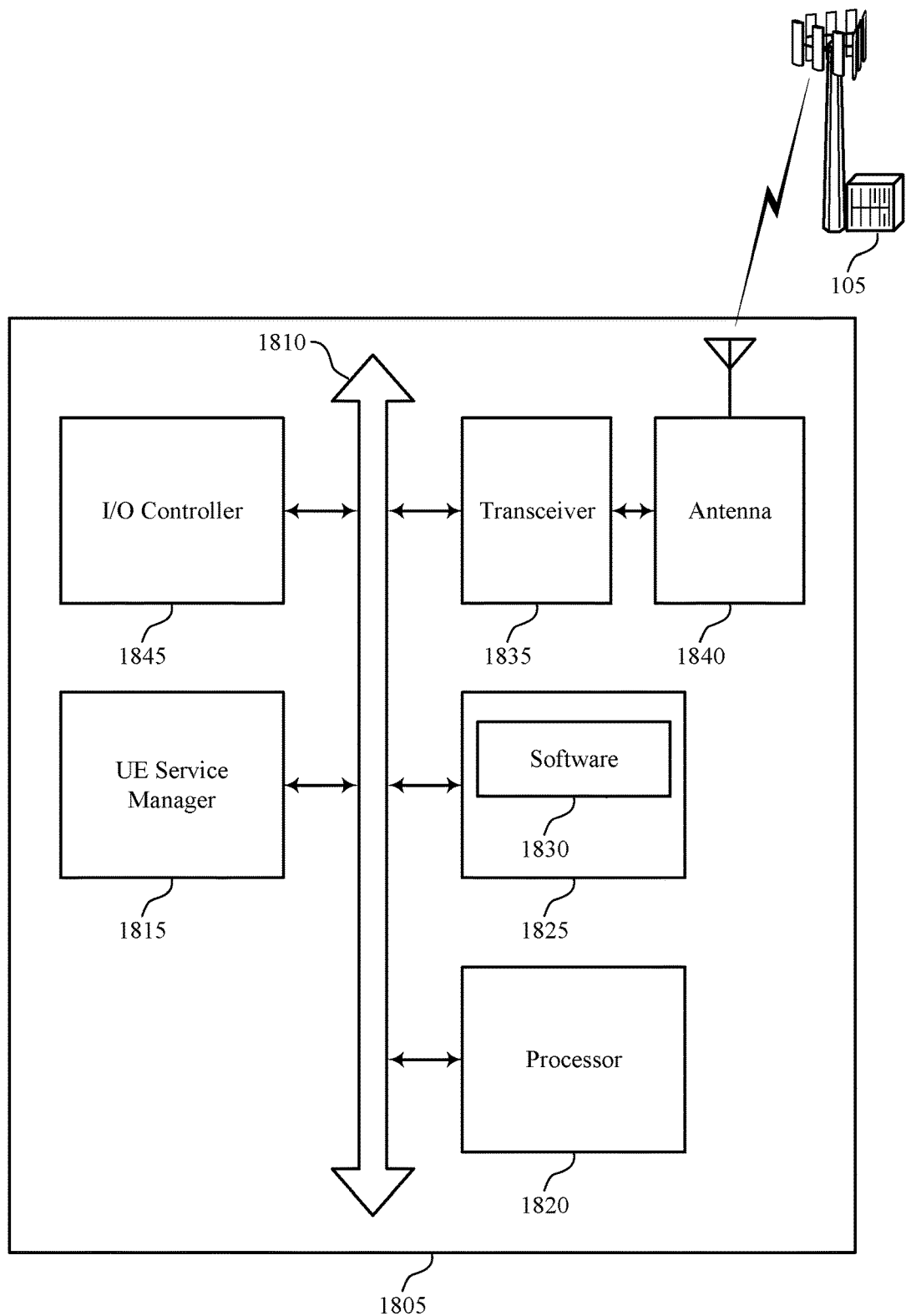
FIG. 18 illustrates a block diagram of a system including a user equipment (UE) that supports high reliability low latency configuration for wireless communications systems in accordance with aspects of the present disclosure.

FIG. 18 shows a diagram of a system 1800 including a device 1805 that supports high reliability low latency configuration for wireless communications systems in accordance with aspects of the present disclosure. Device 1805 may be an example of or include the components of UE 115 as described above, e.g., with reference to FIG. 1. Device 1805 may include components for bi-directional voice and data communications including components for transmitting and receiving communications, including UE service manager 1815, processor 1820, memory 1825, software 1830, transceiver 1835, antenna 1840, and I/O controller 1845. These components may be in electronic communication via one or more busses (e.g., bus 1810). Device 1805 may communicate wirelessly with one or more base stations 105.

Processor 1820 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting high reliability low latency configuration for wireless communications systems).

Memory 1825 may include RAM and ROM. The memory 1825 may store computer-readable, computer-executable software 1830 including instructions that, when executed, cause the processor to perform various functions described herein. In some cases, the memory 1825 may contain, among other things, a BIOS which may control basic hardware and/or software operation such as the interaction with peripheral components or devices.

Software 1830 may include code to implement aspects of the present disclosure, including code to support high reliability low latency configuration for wireless communications systems. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In some cases, the wireless device may include a single antenna 1840. However, in some cases the device may have more than one antenna 1840, which may be capable of concurrently transmitting or receiving multiple wireless transmissions.

I/O controller 1845 may manage input and output signals for device 1805. I/O controller 1845 may also manage peripherals not integrated into device 1805. In some cases, I/O controller 1845 may represent a physical connection or port to an external peripheral. In some cases, I/O controller 1845 may utilize an operating system such as iOS®, ANDROID®, MS-DOS®, MS-WINDOWS®, OS/2®, UNIX®, LINUX®, or another known operating system. In other cases, I/O controller 1845 may represent or interact with a modem, a keyboard, a mouse, a touchscreen, or a similar device. In some cases, I/O controller 1845 may be implemented as part of a processor. In some cases, a user may interact with device 1805 via I/O controller 1845 or via hardware components controlled by I/O controller 1845.

Figure 19:
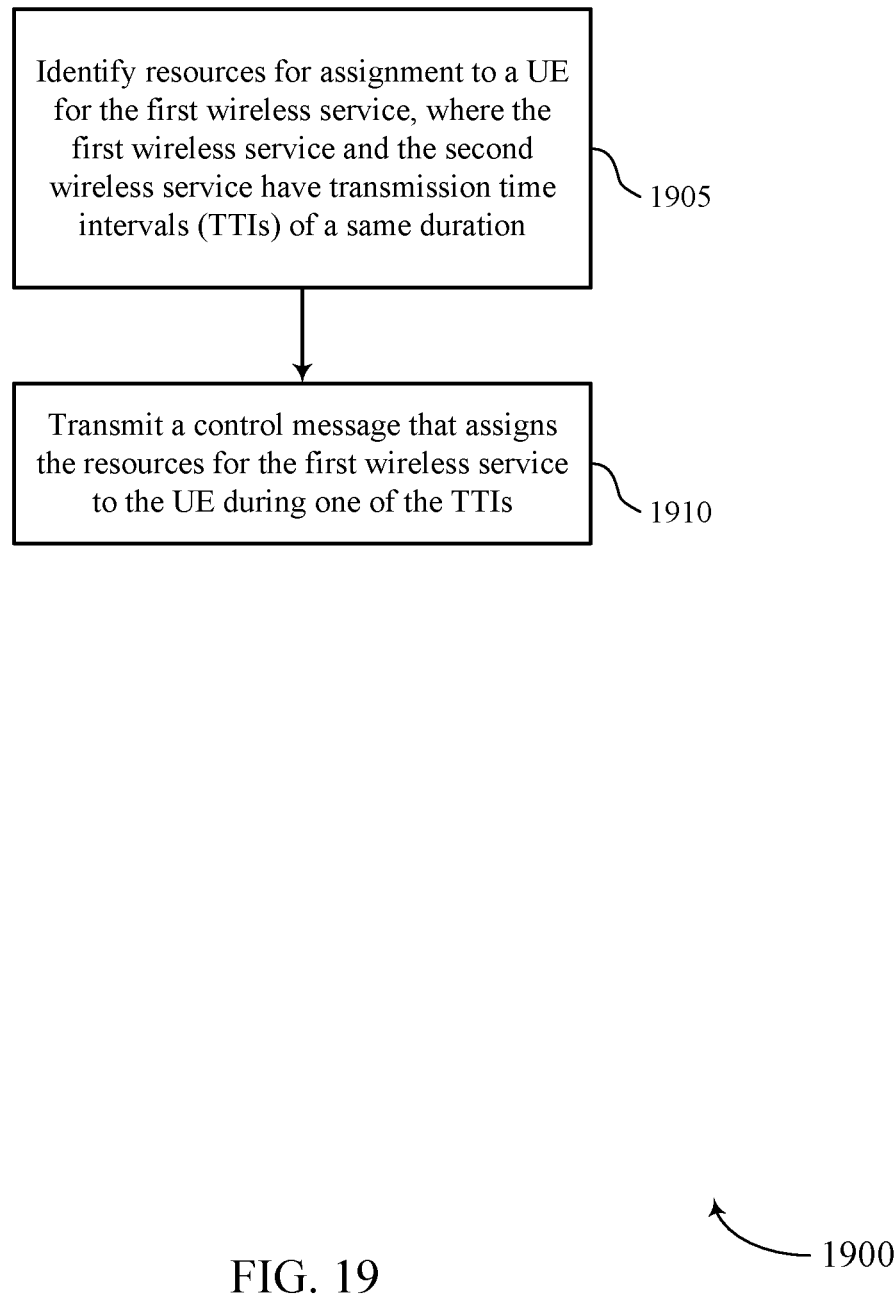
FIGS. 19 through 22 illustrate methods for high reliability low latency configuration for wireless communications systems in accordance with aspects of the present disclosure.

FIG. 19 shows a flowchart illustrating a method 1900 for high reliability low latency configuration for wireless communications systems in accordance with aspects of the present disclosure. The operations of method 1900 may be implemented by a base station 105 or its components as described herein. For example, the operations of method 1900 may be performed by a base station service manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may identify resources for assignment to a UE for the first wireless service, wherein the first wireless service and the second wireless service have TTIs of a same duration. The operations of block 1905 may be performed according to the methods described with reference to FIGS. 1 through 10. In certain examples, aspects of the operations of block 1905 may be performed by a resource component as described with reference to FIGS. 11 through 14.

At block 1910 the base station 105 may transmit a control message that assigns the resources for the first wireless service to the UE during one of the TTIs. The operations of block 1910 may be performed according to the methods described with reference to FIGS. 1 through 10. In certain examples, aspects of the operations of block 1910 may be performed by a message transmitter as described with reference to FIGS. 11 through 14.

Figure 20:
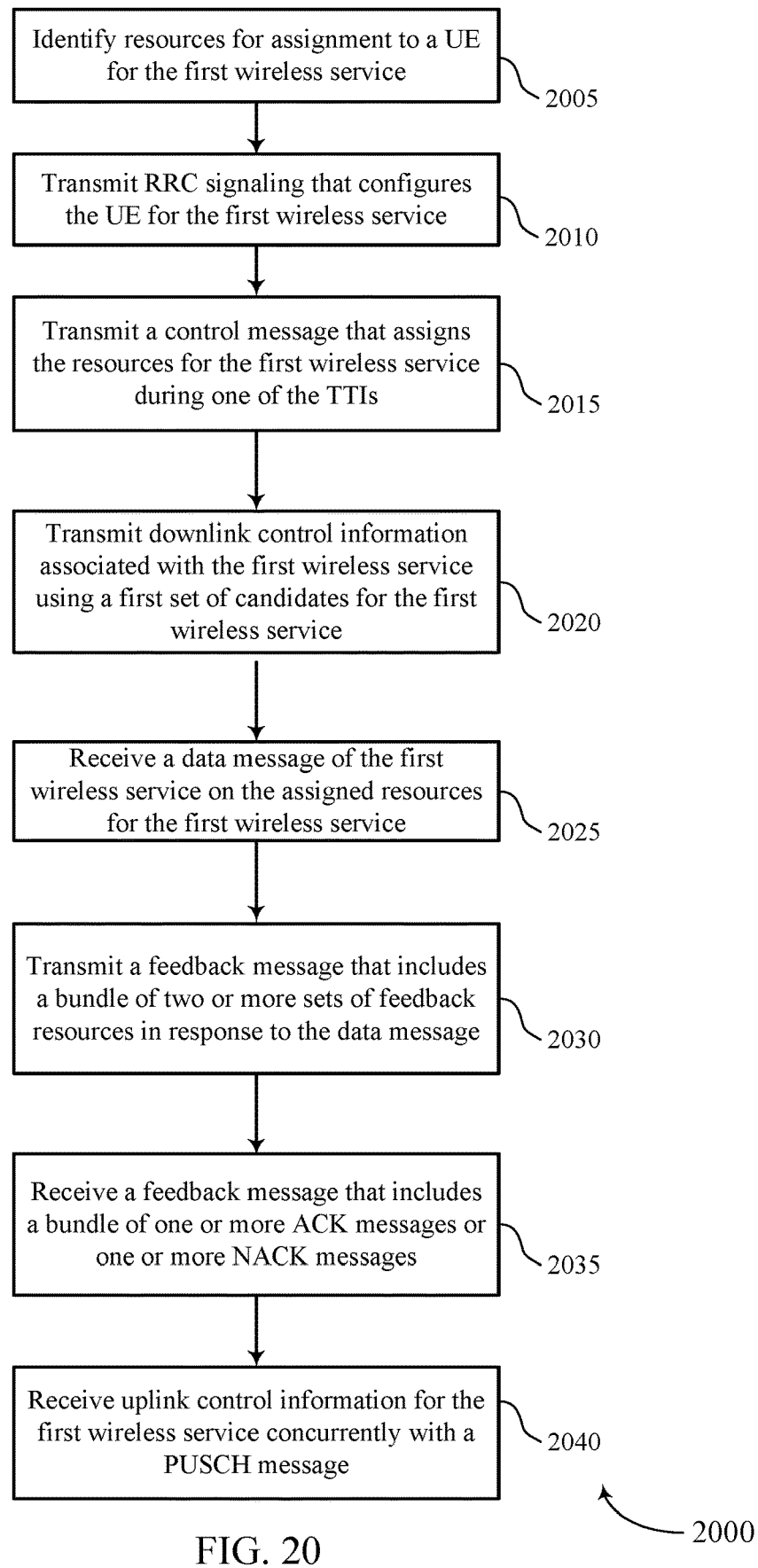

FIG. 20 shows a flowchart illustrating a method 2000 for high reliability low latency configuration for wireless communications systems in accordance with aspects of the present disclosure. The operations of method 2000 may be implemented by a base station 105 or its components as described herein. For example, the operations of method 2000 may be performed by a base station service manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may identify resources for assignment to a UE for the first wireless service, wherein the first wireless service and the second wireless service have TTIs of a same duration. The operations of block 2005 may be performed according to the methods described with reference to FIGS. 1 through 10. In certain examples, aspects of the operations of block 2005 may be performed by a resource component as described with reference to FIGS. 11 through 14.

At block 2010 the base station 105 may transmit, to the UE, RRC signaling that configures the UE for the first wireless service, wherein the control message is transmitted based at least in part on configuring the UE for the first wireless service. The operations of block 2010 may be performed according to the methods described with reference to FIGS. 1 through 10. In certain examples, aspects of the operations of block 2010 may be performed by a RRC component as described with reference to FIGS. 11 through 14.

At block 2015 the base station 105 may transmit a control message that assigns the resources for the first wireless service to the UE during one of the TTIs. The operations of block 2015 may be performed according to the methods described with reference to FIGS. 1 through 10. In certain examples, aspects of the operations of block 2015 may be performed by a message transmitter as described with reference to FIGS. 11 through 14.

At block 2020 the base station 105 may transmit downlink control information associated with the first wireless service using a first set of candidates for the first wireless service. The operations of block 2020 may be performed according to the methods described with reference to FIGS. 1 through 10. In certain examples, aspects of the operations of block 2020 may be performed by a downlink control transmitter as described with reference to FIGS. 11 through 14.

At block 2025 the base station 105 may receive, from the UE, a data message of the first wireless service on the assigned resources for the first wireless service. The operations of block 2025 may be performed according to the methods described with reference to FIGS. 1 through 10. In certain examples, aspects of the operations of block 2025 may be performed by a data component as described with reference to FIGS. 11 through 14.

At block 2030 the base station 105 may transmit a feedback message to the UE using at least one of spatial bundling, time-domain bundling, or frequency-domain bundling. The operations of block 2030 may be performed according to the methods described with reference to FIGS. 1 through 10. In certain examples, aspects of the operations of block 2030 may be performed by a feedback component as described with reference to FIGS. 11 through 14.

At block 2035 the base station 105 may receive, from the UE, a feedback message that comprises a bundle of one or more ACK messages or one or more NACK messages. The operations of block 2035 may be performed according to the methods described with reference to FIGS. 1 through 10. In certain examples, aspects of the operations of block 2035 may be performed by a feedback component as described with reference to FIGS. 11 through 14.

At block 2040 the base station 105 may receive, from the UE, uplink control information for the first wireless service piggybacked with a PUSCH message. The operations of block 2040 may be performed according to the methods described with reference to FIGS. 1 through 10. In certain examples, aspects of the operations of block 2040 may be performed by a uplink control component as described with reference to FIGS. 11 through 14.

Figure 21:
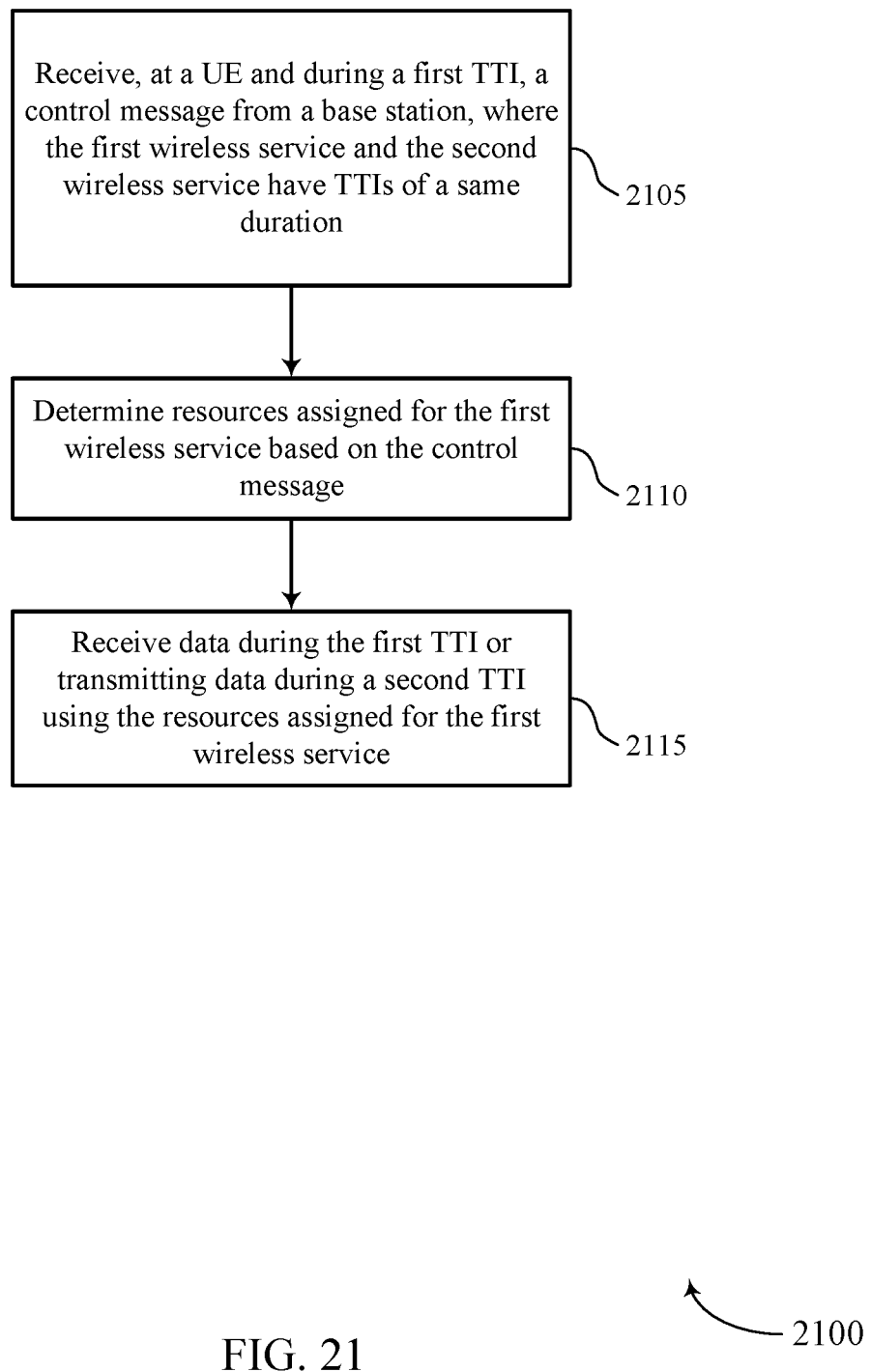

FIG. 21 shows a flowchart illustrating a method 2100 for high reliability low latency configuration for wireless communications systems in accordance with aspects of the present disclosure. The operations of method 2100 may be implemented by a UE 115 or its components as described herein. For example, the operations of method 2100 may be performed by a UE service manager as described with reference to FIGS. 15 through 18. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive a control message from a base station, wherein the first wireless service and the second wireless service have TTIs of a same duration. The operations of block 2105 may be performed according to the methods described with reference to FIGS. 1 through 10. In certain examples, aspects of the operations of block 2105 may be performed by a control message component as described with reference to FIGS. 15 through 18.

At block 2110 the UE 115 may determine resources assigned for the first wireless service based at least in part on the control message. The operations of block 2110 may be performed according to the methods described with reference to FIGS. 1 through 10. In certain examples, aspects of the operations of block 2110 may be performed by a resource component as described with reference to FIGS. 15 through 18.

At block 2115 the UE 115 may receive data during the first TTI or transmitting data during a second TTI using the resources assigned for the first wireless service. The operations of block 2115 may be performed according to the methods described with reference to FIGS. 1 through 10. In certain examples, aspects of the operations of block 2115 may be performed by a data component as described with reference to FIGS. 15 through 18.

Figure 22:
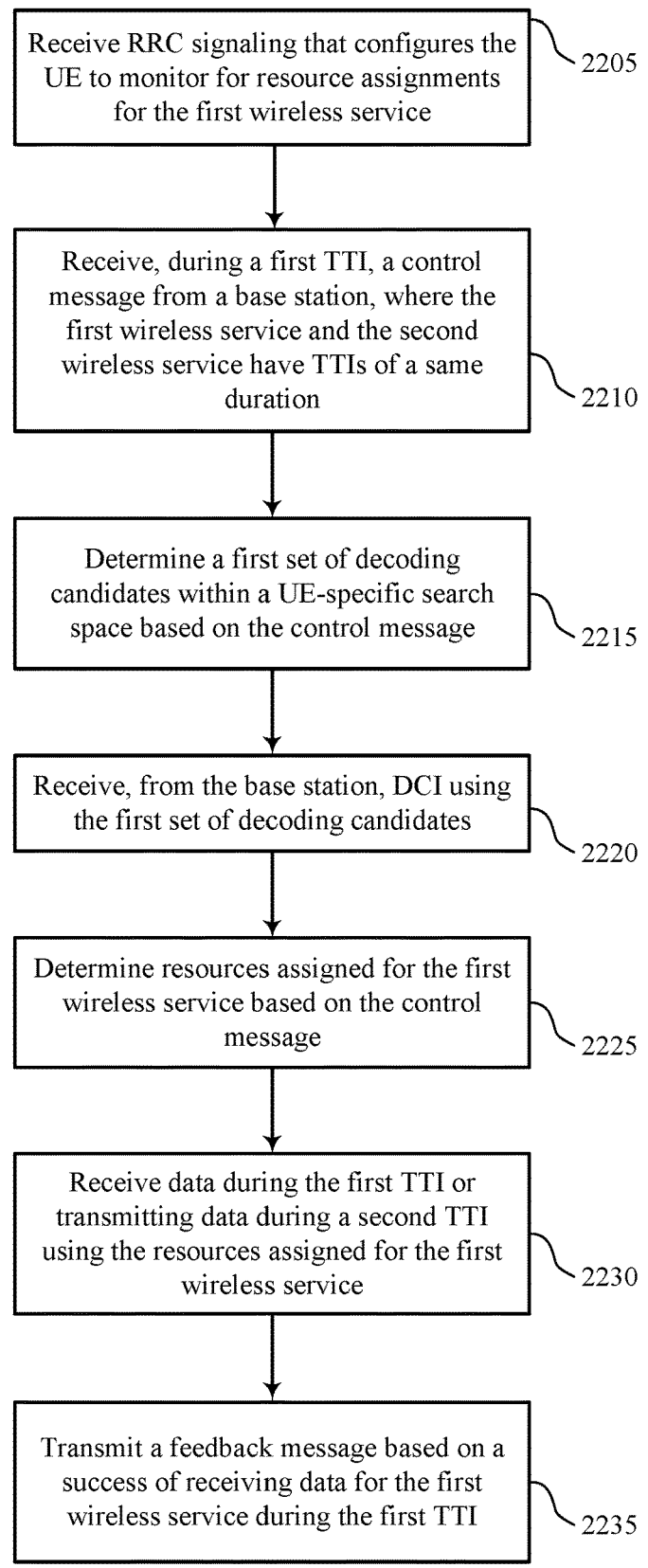

FIG. 22 shows a flowchart illustrating a method 2200 for high reliability low latency configuration for wireless communications systems in accordance with aspects of the present disclosure. The operations of method 2200 may be implemented by a UE 115 or its components as described herein. For example, the operations of method 2200 may be performed by a UE service manager as described with reference to FIGS. 15 through 18. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may receive RRC signaling that configures the UE to monitor for resource assignments for the first wireless service, wherein the control message is received based at least in part on receiving the RRC signaling. The operations of block 2205 may be performed according to the methods described with reference to FIGS. 1 through 10. In certain examples, aspects of the operations of block 2205 may be performed by a RRC signaling component as described with reference to FIGS. 15 through 18.

At block 2210 the UE 115 may receive, at a UE and during a first TTI, a control message from a base station, wherein the first wireless service and the second wireless service have TTIs of a same duration. The operations of block 2210 may be performed according to the methods described with reference to FIGS. 1 through 10. In certain examples, aspects of the operations of block 2210 may be performed by a control message component as described with reference to FIGS. 15 through 18.

At block 2215 the UE 115 may determine a first set of decoding candidates within a UE-specific search space based at least in part on the control message. The operations of block 2215 may be performed according to the methods described with reference to FIGS. 1 through 10. In certain examples, aspects of the operations of block 2215 may be performed by a candidate component as described with reference to FIGS. 15 through 18.

At block 2220 the UE 115 may receive, from the base station, DCI using the first set of decoding candidates, wherein determining resources assigned for the first wireless service is based at least in part on the DCI. The operations of block 2220 may be performed according to the methods described with reference to FIGS. 1 through 10. In certain examples, aspects of the operations of block 2220 may be performed by a downlink control transmitter as described with reference to FIGS. 15 through 18.

At block 2225 the UE 115 may determine resources assigned for the first wireless service based at least in part on the control message. The operations of block 2225 may be performed according to the methods described with reference to FIGS. 1 through 10. In certain examples, aspects of the operations of block 2225 may be performed by a resource component as described with reference to FIGS. 15 through 18.

At block 2230 the UE 115 may receive data during the first TTI or transmitting data during a second TTI using the resources assigned for the first wireless service. The operations of block 2230 may be performed according to the methods described with reference to FIGS. 1 through 10. In certain examples, aspects of the operations of block 2230 may be performed by a data component as described with reference to FIGS. 15 through 18.

At block 2235 the UE 115 may transmit a feedback message based at least in part on a success of receiving data for the first wireless service during the first TTI. The operations of block 2235 may be performed according to the methods described with reference to FIGS. 1 through 10. In certain examples, aspects of the operations of block 2235 may be performed by a feedback component as described with reference to FIGS. 15 through 18.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a system that supports a first wireless service having a first target decoding error rate and a first target latency value and a second wireless service having a second target decoding error rate that is higher than the first target decoding error rate or a second target latency value that is higher than the first target latency value, comprising:
identifying resources for assignment to a user equipment (UE) for the first wireless service, wherein the first wireless service and the second wireless service have transmission time intervals (TTIs) of a same duration; and
transmitting, to the UE, at least one control message that assigns the resources for the first wireless service to the UE during one of the TTIs, the at least one control message informing the UE that the resources assigned to the UE are associated with the first wireless service.

2. The method of claim 1, wherein:
the second wireless service has the second target decoding error rate and the second target latency value.

3. The method of claim 1, further comprising:
transmitting, to the UE, radio resource control (RRC) signaling that configures the UE for the first wireless service, wherein the at least one control message is transmitted based at least in part on configuring the UE for the first wireless service.

4. The method of claim 1, wherein:
the at least one control message comprises at least one of a first radio network temporary identifier (RNTI), a first downlink control information (DCI) format, a first DCI indication, a first set of control decoding candidates, a first semi-static configuration, or any combination thereof that informs the UE that the resources assigned to the UE are associated with the first wireless service.

5. The method of claim 4, further comprising:
identifying second resources for assignment to the UE for the second wireless service, and
transmitting, to the UE, a second control message that assigns the second resources for the second wireless service to the UE during one of the TTIs, wherein the second control message comprises at least one of a second RNTI, a second DCI format, a second DCI indication, a second set of control decoding candidates, a second semi-static configuration, or any combination thereof that informs the UE that the second resources assigned to the UE are associated with the second wireless service.

6. The method of claim 1, further comprising:
transmitting downlink control information (DCI) associated with the first wireless service using a first set of decoding candidates for the first wireless service.

7. The method of claim 6, wherein:
a number of aggregation levels for the first set of decoding candidates is different from a number of aggregation levels associated with a second set of decoding candidates for the second wireless service.

8. The method of claim 1, further comprising:
receiving, from the UE, a data message of the first wireless service using the resources assigned to the UE for the first wireless service; and
transmitting a feedback message to the UE using at least one of spatial bundling, time-domain bundling, or frequency-domain bundling in response to the data message.

9. The method of claim 1, further comprising:
receiving, from the UE, a feedback message responsive to at least the control message and that comprises an acknowledgement (ACK) message or negative ACK (NACK) message transmitted with at least one of spatial bundling, time-domain bundling, or frequency domain bundling.

10. The method of claim 9, wherein:
the feedback message further comprises a scheduling request combined with the ACK or NACK message.

11. The method of claim 9, wherein:
the feedback message includes no channel state information (CSI) feedback.

12. The method of claim 9, wherein:
the feedback message includes channel state information (CSI) feedback without a channel quality indicator (CQI).

13. The method of claim 9, further comprising:
receiving, from the UE, a first set of channel state information (CSI) feedback associated with the first wireless service, wherein the first set of CSI feedback is included in the feedback message; and
receiving, from the UE, a second set of CSI feedback associated with the second wireless service, wherein the second set of CSI feedback is included in a second feedback message associated with the second wireless service, and wherein the second feedback message comprises a second ACK message or second NACK message.

14. The method of claim 13, wherein the first set of CSI feedback and the second set of CSI feedback differ in an amount of channel quality indicator (CQI) information included in each of the first set of CSI feedback and the second set of CSI feedback.

15. The method of claim 13, wherein the first set of CSI feedback is associated with a first set of interference hypotheses and the second set of CSI feedback is associated with a second set of interference hypotheses.

16. The method of claim 1, further comprising:
transmitting, to the UE, a first indication of a first set of offsets to be used for piggy-backing uplink control information (UCI) with a physical uplink shared channel (PUSCH) message associated with the first wireless service; and
transmitting, to the UE, a second indication of a second set of offsets to be used for piggy-backing UCI with a second PUSCH message associated with the second wireless service.

17. The method of claim 16, wherein transmitting the first indication and transmitting the second indication comprise:
transmitting the first indication and transmitting the second indication via either downlink control information (DCI) or via radio resource control (RRC) signaling.

18. The method of claim 16, further comprising:
receiving, from the UE, UCI associated with the first wireless service and piggy-backed with the PUSCH message in accordance with the first set of offsets.

19. The method of claim 1, further comprising:
transmitting, to the UE, a first set of UE-specific power control parameters, wherein the first set of power control parameters is associated with the first wireless service, and
transmitting, to the UE, a second set of UE-specific power control parameters, wherein the second set of power control parameters is associated with the second wireless service.

20. The method of claim 1, wherein identifying the resources comprises selecting the resources based at least in part on the first target decoding error rate.

21. The method of claim 1, wherein the TTIs have a duration of 1 ms.

22. A method for wireless communication in a system that supports a first wireless service having a first target decoding error rate and a first target latency value and a second wireless service having a second target decoding error rate that is higher than the first target decoding error rate or a second target latency value that is higher than the first target latency value, comprising:
receiving, at a user equipment (UE) and during a first transmission time interval (TTI), at least one control message from a base station that assigns the resources for the first wireless service to the UE during one of the TTIs, the at least one control message informing the UE that the resources assigned to the UE are associated with the first wireless service, wherein the first wireless service and the second wireless service have TTIs of a same duration;
determining resources assigned to the UE for the first wireless service based at least in part on the at least one control message; and
receiving data during the first TTI or transmitting data during a second TTI using the resources assigned to the UE for the first wireless service.

23. The method of claim 22, wherein:
the second wireless service has the second target decoding error rate and the second target latency value.

24. The method of claim 22, further comprising:
receiving radio resource control (RRC) signaling that configures the UE with a configuration to monitor for resource assignments for the first wireless service, wherein the at least one control message is received based at least in part on receiving the RRC signaling.

25. The method of claim 24, further comprising:
receiving RRC signaling that configures the UE with a second configuration to monitor for second resource assignments for the second wireless service.

26. The method of claim 25, wherein:
the second wireless service has the second target error decoding rate and a third target latency value that is lower than the first target latency value.

27. The method of claim 24, wherein:
the configuration of the UE is based at least in part on a timing advance for the UE or a transport block size (TBS) limitation.

28. The method of claim 22, wherein:
the first TTI comprises a long term evolution (LTE) subframe.

29. The method of claim 22, further comprising:
receiving, at the UE and during a third TTI, a second control message from the base station;
determining second resources assigned to the UE for the second wireless service based at least in part on the second control message; and
receiving data during the third TTI or transmitting data during a fourth TTI using the second resources assigned to the UE for the second wireless service.

30. The method of claim 22, further comprising:
transmitting a feedback message responsive to at least the at least one control message and based at least in part on a success of receiving data for the first wireless service during the first TTI.

31. The method of claim 30, wherein:
the feedback message includes no channel state information (CSI) feedback.

32. The method of claim 30, wherein:
the feedback message includes channel state information (CSI) feedback without a channel quality indicator (CQI).

33. The method of claim 30, further comprising:
transmitting a first set of channel state information (CSI) feedback associated with the first wireless service; and
transmitting a second set of CSI feedback associated with the second wireless service.

34. The method of claim 33, wherein:
the first set of CSI feedback and the second set of CSI feedback differ in an amount of channel quality indicator (CQI) information included in each of the first set of CSI feedback and the second set of CSI feedback.

35. The method of claim 30, wherein:
the feedback message is transmitted using at least one of spatial bundling, time-domain bundling, or frequency-domain bundling.

36. The method of claim 30, wherein transmitting the feedback message comprises:
transmitting at least one of an acknowledgement (ACK) message or a negative ACK (NACK) within a predetermined time period following the first TTI.

37. The method of claim 36, wherein:
the predetermined time period comprises at least three TTIs.

38. The method of claim 22, wherein:
the at least one control message comprises at least one of a radio network temporary identifier (RNTI), a downlink control information (DCI) format, a DCI indication, a set of control candidates, a semi-static configuration, or any combination thereof that informs the UE that the resources assigned to the UE are associated with the first wireless service.

39. The method of claim 38, further comprising:
receiving, at the UE and during a second TTI, a second control message from the base station, wherein the second control message comprises at least one of a second RNTI, a second DCI format, a second DCI indication, a second set of control decoding candidates, a second semi-static configuration, or any combination thereof that informs the UE that resources assigned to the UE are associated with the second wireless service.

40. The method of claim 22, further comprising:
determining a first set of decoding candidates within a UE-specific search space based at least in part on the at least one control message; and
receiving, from the base station, downlink control information (DCI) using the first set of decoding candidates, wherein determining the resources assigned to the UE for the first wireless service is based at least in part on the DCI.

41. The method of claim 22, further comprising:
receiving a first indication of a first set of offsets to be used for piggy-backing uplink control information (UCI) with a physical uplink shared channel (PUSCH)

message, wherein the PUSCH message is associated with the first wireless service.

42. The method of claim 41, further comprising:
receiving a second indication of a second set of offsets to be used for piggy-backing the UCI with a second PUSCH message, wherein the second PUSCH message is associated with the second wireless service.

43. The method of claim 41, further comprising:
transmitting UCI associated with the first wireless service and piggy-backed with the PUSCH message in accordance with the first set of offsets.

44. The method of claim 22, further comprising:
receiving a first indication of a first offset to be used for piggy-backing the uplink control information (UCI) with a first physical uplink shared channel (PUSCH) message, wherein the first PUSCH message is associated with the first wireless service;
receiving a second indication of a second offset to be used for piggy-backing the UCI with a second PUSCH message, wherein the second PUSCH message is associated with the second wireless service;
determining whether to use the first offset or the second offset;
in accordance with a determination to use the first offset, transmitting UCI associated with the first wireless service piggy-backed with the first PUSCH message in accordance with the first offset.

45. The method of claim 41, wherein:
the uplink control information for the first wireless service comprises a different set of parameters than uplink control information for the second wireless service.

46. The method of claim 41, wherein:
the first indication is received via either downlink control information (DCI) or via radio resource control (RRC) signaling.

47. The method of claim 22, further comprising:
receiving a first set of UE-specific power control parameters, wherein the first set of power control parameters is associated with the first wireless service; and
receiving a second set of UE-specific power control parameters, wherein the second set of power control parameters is associated with the second wireless service.

48. An apparatus for wireless communication in a system that supports a first wireless service having a first target decoding error rate and a first target latency value and a second wireless service having a second target decoding error rate that is higher than the first target decoding error rate or a second target latency value that is higher than the first target latency value, comprising:
means for identifying resources for assignment to a user equipment (UE) for the first wireless service, wherein the first wireless service and the second wireless service have transmission time intervals (TTIs) of a same duration; and
means for transmitting, to the UE, at least one control message that assigns the resources for the first wireless service to the UE during one of the TTIs, the at least one control message informing the UE that the resources assigned to the UE are associated with the first wireless service.

49. An apparatus for wireless communication in a system that supports a first wireless service having a first target decoding error rate and a first target latency value and a second wireless service having a second target decoding error rate that is higher than the first target decoding error rate or a second target latency value that is higher than the first target latency value, comprising:
means for receiving, at a user equipment (UE) and during a first transmission time interval (TTI), at least one control message from a base station that assigns the resources for the first wireless service to the UE during one of the TTIs, the at least one control message informing the UE that the resources assigned to the UE are associated with the first wireless service, wherein the first wireless service and the second wireless service have TTIs of a same duration;
means for determining resources assigned to the UE for the first wireless service based at least in part on the at least one control message; and
means for receiving data during the first TTI or transmitting data during a second TTI using the resources assigned to the UE for the first wireless service.

50. An apparatus for wireless communication in a system that supports a first wireless service having a first target decoding error rate and a first target latency value and a second wireless service having a second target decoding error rate that is higher than the first target decoding error rate or a second target latency value that is higher than the first target latency value, comprising:
a processor;
memory in electronic communication with the processor; and
instructions stored in the memory and operable, when executed by the processor, to cause the apparatus to:
identify resources for assignment to a user equipment (UE) for the first wireless service, wherein the first wireless service and the second wireless service have transmission time intervals (TTIs) of a same duration; and
transmit, to the UE, at least one control message that assigns the resources for the first wireless service to the UE during one of the TTIs, the at least one control message informing the UE that the resources assigned to the UE are associated with the first wireless service.

51. An apparatus for wireless communication in a system that supports a first wireless service having a first target decoding error rate and a first target latency value and a second wireless service having a second target decoding error rate that is higher than the first target decoding error rate or a second target latency value that is higher than the first target latency value, comprising:
a processor;
memory in electronic communication with the processor; and
instructions stored in the memory and operable, when executed by the processor, to cause the apparatus to:
receive, at a user equipment (UE) and during a first transmission time interval (TTI), at least one control message from a base station that assigns the resources for the first wireless service to the UE during one of the TTIs, the at least one control message informing the UE that the resources assigned to the UE are associated with the first wireless service, wherein the first wireless service and the second wireless service have TTIs of a same duration;
determine resources assigned to the UE for the first wireless service based at least in part on the at least one control message; and receive data during the first TTI or transmitting data during a second TTI using the resources assigned to the UE for the first wireless service.

52. A non-transitory computer readable medium storing code for wireless communication in a system that supports a first wireless service having a first target decoding error rate and a first target latency value and a second wireless service having a second target decoding error rate that is higher than the first target decoding error rate or a second target latency value that is higher than the first target latency value, the code comprising instructions executable to:
  identify resources for assignment to a user equipment (UE) for the first wireless service, wherein the first wireless service and the second wireless service have transmission time intervals (TTIs) of a same duration; and
  transmit, to the UE, at least one control message that assigns the resources for the first wireless service to the UE during one of the TTIs, the at least one control message informing the UE that the resources assigned to the UE are associated with the first wireless service.

53. A non-transitory computer readable medium storing code for wireless communication in a system that supports a first wireless service having a first target decoding error rate and a first target latency value and a second wireless service having a second target decoding error rate that is higher than the first target decoding error rate or a second target latency value that is higher than the first target latency value, the code comprising instructions executable to:
  receive, at a user equipment (UE) and during a first transmission time interval (TTI), at least one control message from a base station that assigns the resources for the first wireless service to the UE during one of the TTIs, the at least one control message informing the UE that the resources assigned to the UE are associated with the first wireless service, wherein the first wireless service and the second wireless service have TTIs of a same duration;
  determine resources assigned to the UE for the first wireless service based at least in part on the at least one control message; and
  receive data during the first TTI or transmitting data during a second TTI using the resources assigned to the UE for the first wireless service.

* * * * *